Dec. 19, 1939.   E. L. HARDER   2,183,646
RELAYING APPARATUS
Filed Jan. 3, 1938   4 Sheets-Sheet 1

WITNESSES:
Leon M. Garman
Fred C. Pitham

INVENTOR
Edwin L. Harder
BY
O. B. Buchanan
ATTORNEY

Dec. 19, 1939.  E. L. HARDER  2,183,646
RELAYING APPARATUS
Filed Jan. 3, 1938  4 Sheets-Sheet 3

WITNESSES:

INVENTOR
Edwin L. Harder
BY
ATTORNEY

Dec. 19, 1939.                  E. L. HARDER                    2,183,646
                              RELAYING APPARATUS
                            Filed Jan. 3, 1938            4 Sheets-Sheet 4

WITNESSES:
C. H. Oberheim

INVENTOR
Edwin L. Harder
BY
O. B. Buchanan
ATTORNEY

Patented Dec. 19, 1939

2,183,646

UNITED STATES PATENT OFFICE 2,183,646

RELAYING APPARATUS

Edwin L. Harder, Forest Hills, Pa., assignor to Westinghouse Electric & Manufacturing Company, East Pittsburgh, Pa., a corporation of Pennsylvania Application January 3, 1938, Serial No. 183,044

25 Claims. (Cl. 175—294)

My invention relates to relays for the protection of transmission lines and other electrical devices in the event of a fault.

One object of my invention is to provide a novel single-element relay, and a novel phase-sequence filtering network for energizing said relay from a polyphase source, whereby the single element has either substantially the same sensitivity in its responsiveness to different possible kinds of faults on a polyphase system or apparatus to be protected, or any other desired relative sensitivenesses to the different kinds of fault, whereby the relay may be made more sensitive to some faults, such as ground-faults, for example, as compared to its sensitivity to other faults, such as three-phase faults, for example.

More specifically, an object of my invention is to provide a composite phase-sequence network which does not respond to the negative phase-sequence current-component of a three-phase line or other apparatus to be protected, responding solely to the positive- and zero-sequence current-components, but weighted, in its response, so that it responds more strongly to one of said sequence-components than to the other, thereby providing means whereby the effectiveness of the response to different kinds of faults may be controlled and adjusted, as will subsequently be described.

Another object of my invention is to provide a combination of a polyphase network which generates a single-phase voltage in response to a plurality of different kinds of faults on a polyphase line, in combination with a rectifier for rectifying the single-phase output of the network, and a polarized relay which receives the rectified current and makes a fault-response accordingly. One advantage of this combination is that the rectifier avoids or minimizes the wattless-current part of the burden on the current or potential transformers which energize the network, thereby reducing the volt-ampere burden on the transformers and thus avoiding a serious difficulty which is commonly applicable to phase-sequence networks because of the increased burdens which they impose upon the transformers supplying them with energy. A second advantage of the rectification of the network-output is that it makes possible the utilization of a polarized relay, which derives most of its energy from its permanent magnet, thus requiring only a very small volt-ampere input to operate the same. This still further reduces the burden on the energizing equipment.

A further innovation, in this combination, according to my invention, is the introduction of a saturating transformer interposed between the output-terminals of the network and the rectifier, thereby equalizing the voltages which are applied to the rectifier (and hence to the relay), even though some kinds of faults may result in excessively large network-voltages.

A still further innovation, in this combination, is the utilization of time-delay means, such as a short-circuiting ring on the magnetic circuit on which the energizing-coil of the relay is wound, whereby shock-excitation is avoided as a result of transients of various kinds, thus avoiding faulty relay-operations as the result of too sudden responses to transients of any sort.

My invention, as thus far described, is particularly applicable to differential protective systems for protecting a transmission line or other electrical apparatus, such as a bus with a plurality of feeders for loads or generators, or a power-transformer. In such differential protective systems, the current entering at one end of the apparatus is compared with the current entering or leaving at the other end, and, in the case of multi-terminal lines or apparatus, the currents entering the different terminals may be totalized, utilizing pilot-wires for effecting the comparison or totalization of currents in the case of transmission lines having terminals located at different sub-stations.

My novel relaying system is particularly applicable to the protection of transmission lines by means of pilot-wires of the telephone type. These pilot-wires are less expensive than carrier-current pilot-protection apparatus up to about 10 miles distance between the ends of the protected line-section. Even above lengths of 10 miles, my invention has certain advantages which make it preferable to carrier-current protection even though the pilot-wires may cost somewhat more.

According to my invention, because of the low current-burden, I am enabled to impose alternating currents on the pilot-wires, whereas heretofore the excessive alternating-current burden has necessitated the utilization of direct current on pilot-wire protective systems for distances of more than a fraction of a mile, where telephone facilities are used. Heretofore, also, alternating-current pilot-wire protective systems have commonly required three or more wires, as against my two wires, at a cost of the order of $3,000 per mile per pair. It is much simpler to provide drainage to reduce induced voltages with only two wires.

My pilot-wire protective system has the further advantage of requiring no battery-supply for the pilot-wires, and only a single fault-responsive relay, as distinguished from the large number of relays which have heretofore been required for responding to the different kinds of faults such as single-phase ground-faults, double-phase ground-faults, line-to-line faults, and three-phase faults.

A still further object of my invention is to provide a novel network and single-phase relay arrangement of the type described, wherein the relay is energized, in two different directions, from two different networks, one network being proportioned so that it has an exaggerated response to harmonics of the line-current, and being arranged to energize the relay in a direction to restrain its response, and the other network being arranged in such manner that the harmonic-responsiveness is repressed, and being arranged to energize the relay in a direction to operate the same, thereby avoiding difficulties due to the magnetizing-currents of either the power-transformers or the current-transformers supplying the networks at each end of a line or other electrical device to be protected.

With the foregoing and other objects in view, my invention consists in the circuits, instrumentalities, systems, combinations and methods hereinafter described and claimed, and illustrated in the accompanying drawings, wherein:

Figure 1:
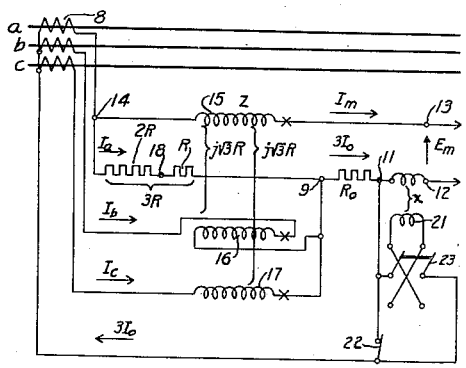
Figure 1 is a diagrammatic view of circuits and apparatus illustrating a preferred embodiment of my invention in a form in which the responses to the positive phase-sequence current and to the zero phase-sequence current are additive, or in the same direction, for faults on the principal phase, as hereinafter described.
Figure 5:
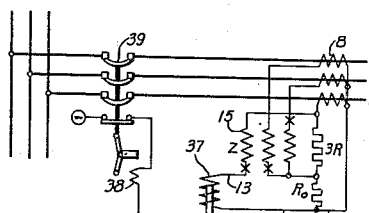
Fig. 5 is a similar view showing the application of the Fig. 1 network, in combination with a relay, for energizing the tripping-circuit of a circuit-breaker in the line to be protected.
Figure 8:
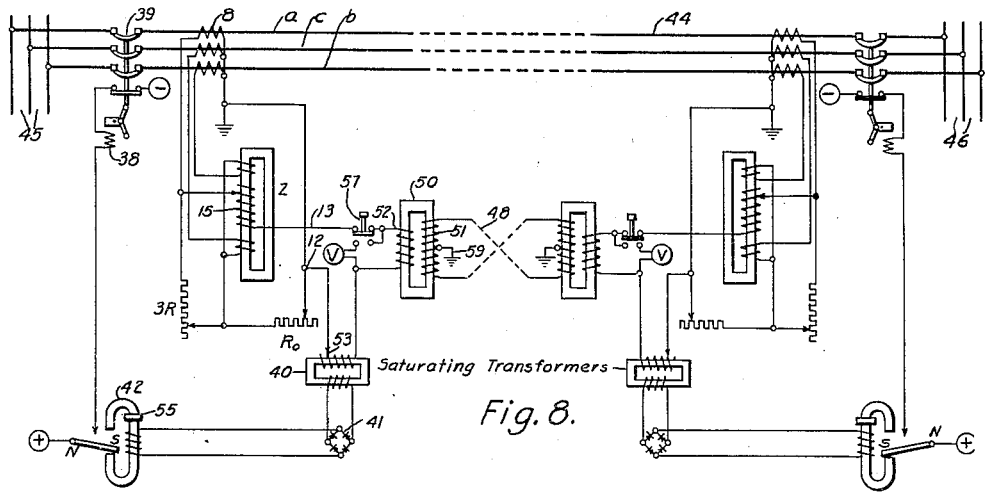
Figure 9:
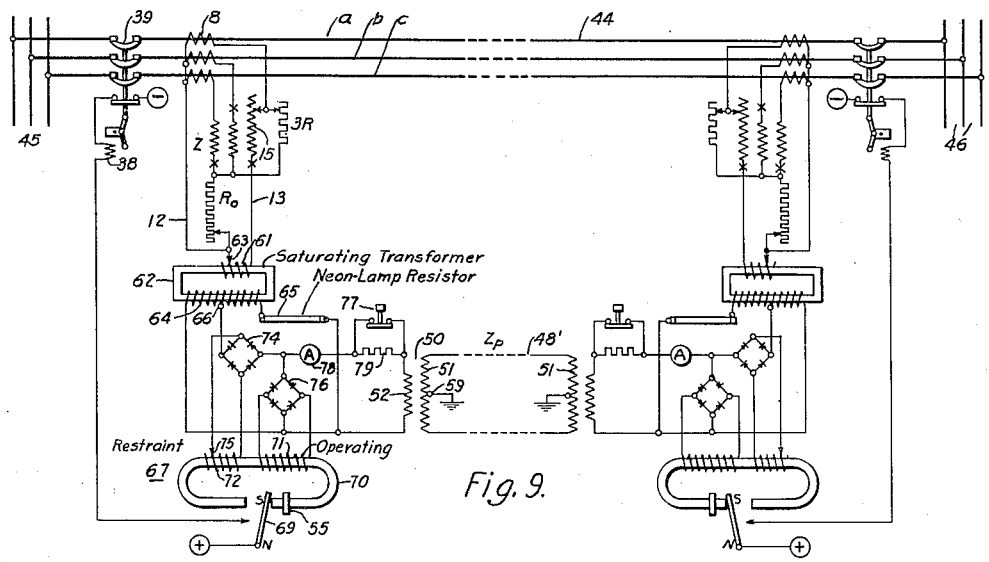
Figure 10:
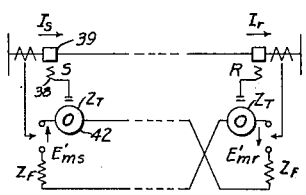
Figure 11:
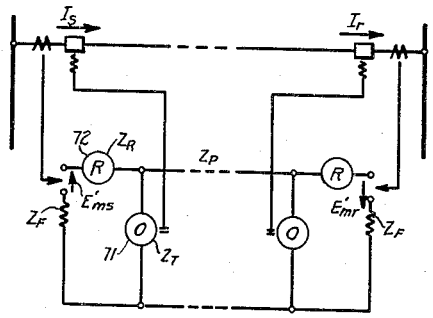
Figure 12:
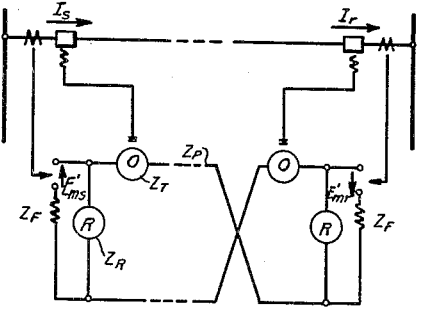
Figure 13:
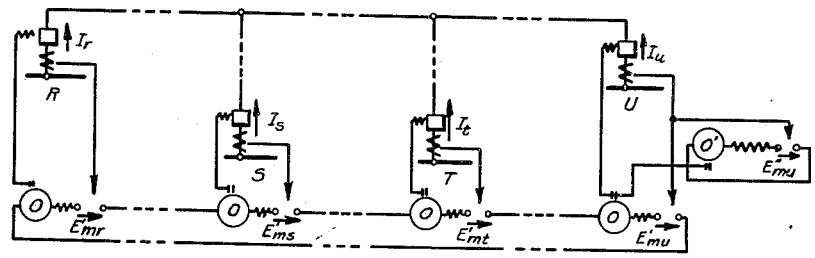
Figure 14:
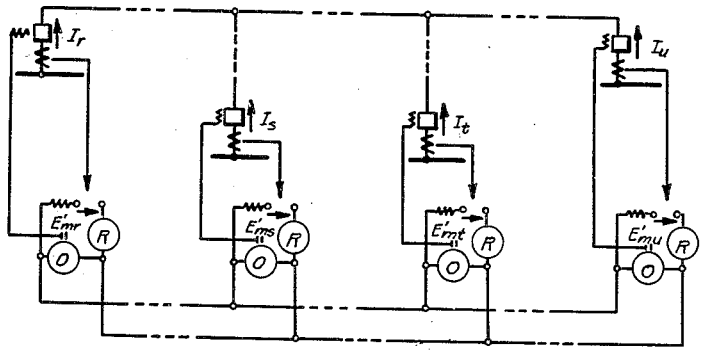
Figure 15:
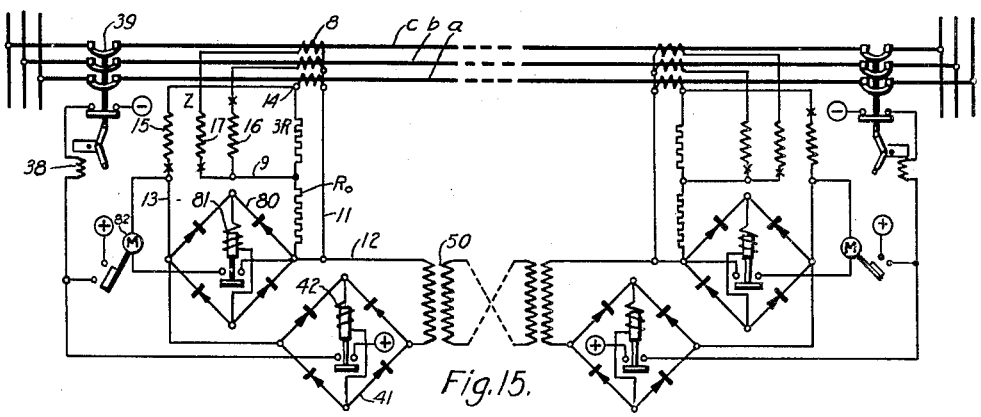
Figure 16:
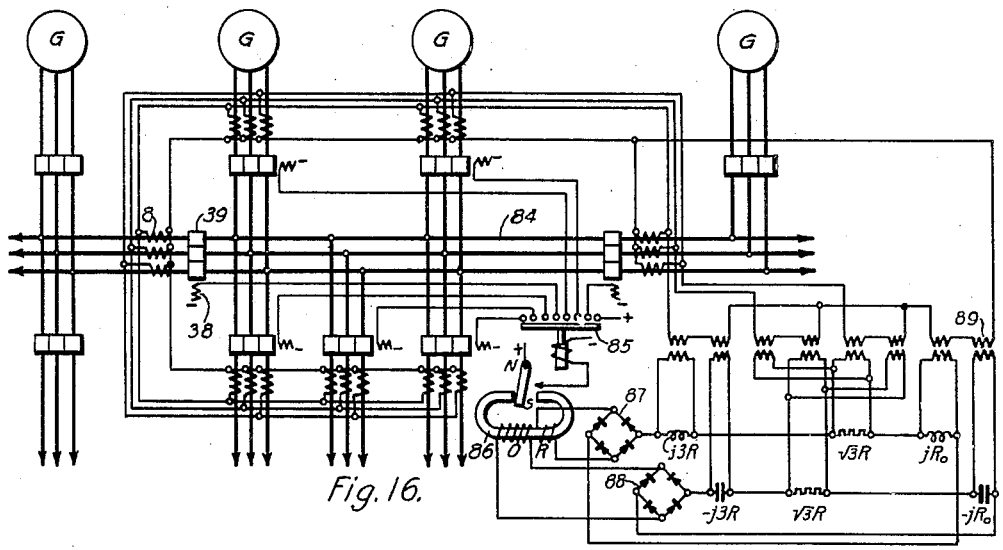
Figure 17:
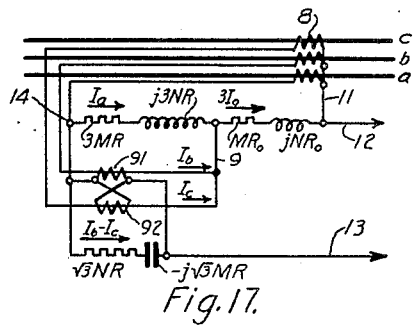

Fig. 8 is a diagrammatic view of circuits and apparatus showing my invention as applied to the protection of a transmission line or other electrical device having input and output ends, in a so-called straight-differential arrangement, that is, an arrangement in which the relay responds to a predetermined difference between the input and output currents, regardless of the magnitude of the current at either terminal;

Fig. 9 is a view similar to Fig. 8, except that it illustrates a ratio-differential system, in which the relay responds to the ratio between the aforesaid difference and the average magnitude of the currents at the two terminals of the protected line or apparatus;

Fig. 10 is a single-line schematic diagram illustrating certain essentials of a straight-differential, balanced-voltage protection system for a transmission line, as shown in Fig. 8;

Fig. 11 is a view similar to Fig. 10, illustrating the essentials of a ratio-differential, circulating-current protection-system for a transmission line, as shown in Fig. 9;

Fig. 12 is a view similar to Fig. 11, illustrating certain essential features of a ratio-differential, balanced-voltage protective system;

Fig. 13 is a view similar to Fig. 10, illustrating a straight-differential, balanced-voltage protective system for a multi-terminal transmission line, that is, a line having more than two terminals;

Fig. 14 is a view similar to Fig. 13, illustrating a ratio-differential, circulating-current protective system for a multi-terminal line;

Fig. 15 is a view similar to Fig. 8, illustrating the energization of a back-up protective device from the same network which is utilized as a part of a pilot-wire differential protective system for a transmission line;

Fig. 16 is a view similar to Fig. 5, illustrating the utilization of two different networks, of different sensitivities to harmonic currents, in connection with a relay having an operating coil or circuit and a restraining coil or circuit, and further illustrating the differential protection of a bus; and Fig. 17 is a view similar to Fig. 1, illustrating the essentials of a network in which impedances other than pure resistances are utilized, in the so-called phase-$a$ branch of the network.

According to one feature of my invention, I apply the three line-currents $I_a$, $I_b$, $I_c$ of a three-phase line to a network which is responsive substantially only to the positive and zero phase-sequence line-currents $I_1$ and $I_0$, according to some relationship, $$E'_m = K(I_1 + kI_0) \quad\quad\quad (1)$$

in which $k$ is a vector-quantity, suitably chosen as will hereinafter be described, either so that the scaler value, $$\overline{E}'_m$$

of the response is substantially the same (within sufficiently close limits to insure the operation of a relay) for all kinds of faults on any or all phases of the line, or so that the relative responses to $I_1$ and $I_0$ may be separately weighted in any desired manner, as will be subsequently described. Reference is had, in my analysis, to the well-known method of "Symmetrical components" as explained in a book of that name by C. F. Wagner and R. D. Evans.

There are a number of variations in the precise details of the network, or its equivalent, that will give the response indicated in Equation 1. Before proceeding any further, I shall describe a preferred form of such a network, as indicated in Fig. 1.

In Fig. 1, a network embodying my invention is energized from a three-phase line $a$, $b$, $c$, through Y-connected current-transformers 8, deriving the three line-currents $I_a$, $I_b$ and $I_c$ (by which I mean any currents having a predetermined relation to the currents actually flowing in the three line-conductors $a$, $b$ and $c$) and the neutral currents $3I_0$. One of the line-currents is designated $I_a$ and passes through a resistance $3R$ and thence to a neutral point 9, from which the circuit continues, through a resistance $R_0$, to a point or conductor 11, from which the neutral-current $3I_0$ is withdrawn and returned to the current-transformers 8.

One lead 12 of the measuring circuit, in Fig. 1, is connected, through a subsequently described reactance X (if desired), to the point 11, and the other lead 13 of the measuring circuit is connected, through an impedance Z, to a point 14 on the input side of the resistance $3R$. The impedance Z is a three-winding reactor having its secondary winding 15 in the measuring circuit just described, and having its two primary windings 16 and 17 in two circuits traversed, respectively, by the currents $I_b$ and $I_c$ in their flow toward the neutral point 9. The mutual reactance between the windings 16 and 15 is $$j\sqrt{3}R$$

and that between the windings 17 and 15 is the same, as indicated on the drawings. The current $I_b$ in the $b$ phase (which lags the $a$ phase by 120°) passes through the windings in the direction opposite to the $c$-phase current $I_c$. The directions of the reactor-windings are indicated by polarity-marks $X$ in accordance with a known convention. The two terminals of the measuring circuit are the two leads 12 and 13 previously described, and these terminals have a terminal-voltage $E_m$ and a measuring-circuit current $I_m$, as indicated by the arrows in Fig. 1.

The properties of the network in Fig. 1 are determined by first considering the so-called open-circuit voltage $E'_m$, that is, the voltage generated within the network between the output-terminals 12 and 13 when no measuring current $I_m$ is flowing in the measuring circuit outside of the network. When the measuring circuit is completed, its current $I_m$ is simply superimposed upon the currents $I_a$, $I_b$, $I_c$ and $3I_0$ already flowing in the network, producing an actual measuring-circuit voltage, $$E_m = E'_m - I_m Z_F \tag{2}$$

in which $Z_F$ is the internal impedance of the network or phase-sequence filter, or $$Z_F = Z + 3R + R_0 + X \tag{3}$$

From Equation 2, it is obvious that the measuring-circuit current $I_m$ is produced by, and porportional to, $E'_m$, so that $E_m$ is also directly proportional to $E'_m$, whether the measuring current $I_m$ be large or small.

A rigorous mathematical theory of my Fig. 1 filter or network will now be given, followed by a non-mathematical exposition of its performance.

Referring to Fig. 1, when no current $I_m$ is drawn from the network-terminals 12, 13, a circuit may be traced, from 12 through the network to 13, in which the sum of all voltage-drops must equal zero, as follows:

$$0 = E'_m - 3I_0 R_0 - 3I_a R - j\sqrt{3} I_b R + j\sqrt{3} I_c R \tag{4}$$

Substituting, for the line-currents, their sequence-components, $$E'_m = 3R_0 I_0 + 3R(I_0 + I_1 + I_2) + j\sqrt{3}R(I_0 + a^2 I_1 + a I_2) - j\sqrt{3}R(I_0 + a I_1 + a^2 I_2)$$

where $$\left.\begin{array}{l} a = \epsilon^{j120°} = -\frac{1}{2} + j\frac{1}{2}\sqrt{3} \\ a^2 = \epsilon^{j240°} = -\frac{1}{2} - j\frac{1}{2}\sqrt{3} \\ a^3 = \epsilon^{j360°} = 1 \end{array}\right\} \tag{5}$$

Collecting coefficients of sequence-currents, $$E'_m = (3R_0 + 3R)I_0 + (3 + j\sqrt{3}a^2 - j\sqrt{3}a)RI_1 + (3 + j\sqrt{3}a - j\sqrt{3}a^2)RI_2$$

and since $$j(a^2 - a) = \sqrt{3}$$

$$E'_m = 6RI_1 + (3R + 3R_0)I_0$$
$$= 6R\left(I_1 + \frac{R + R_0}{2R}I_0\right) \tag{6}$$

Comparing Equations 6 and 1, the weighting-factor $k$ is found to be $$k = \frac{R + R_0}{2R} \tag{7}$$

It will thus be seen that I have provided a network which produces a measuring voltage $E'_m$ dependent upon $(I_1 + kI_0)$, according to Equation 1. It is necessary to know the value of the measuring voltage $E'_m$ for each one of the 10 possible different kinds of faults, namely, a three-phase fault ABC, a line-to-line fault in any one of the combinations AB, BC or CA, a double line-to-ground fault in any one of the combinations ABG, BCG or CAG, and a single-phase ground-fault on any one of the phases AG, BG or CG.

In each case, we must know the magnitude of the positive-sequence current $I_1$, and the magnitude and the relative phase of the zero-sequence current $I_0$, for any particular fault, in order to substitute these values in Equation 1, so as to ascertain the response of the nework.

For faults which are symmetrical with respect to the a-phase, that is, for the faults ABC, BC, BCG, and AG, the values and relative phases of the sequence-currents $I_1$ and $I_0$ are readily obtained n terms of the phase-sequence line-impedances $Z_0$, $Z_1$ and $Z_2$.

In most transmission systems, the negative-sequence impedance $Z_2$ is substantially equal to $Z_1$, and is substantially in phase with $Z_1$, and in order to illustrate the application of my invention, I shall assume hereinafter that $Z_2$ is equal to $Z_1$, with the understanding that, in any system in which this assumption is not warranted, the actual values may be substituted.

The relative magnitude of $Z_0$ with respect to $Z_1$ may vary from $Z_0 = Z_1$, for well-grounded systems, to perhaps $Z_0 = 30Z_1$, or higher, for poorly grounded systems. With high-reactance groundings, the zero-sequence system-impedance $Z_0$ may be 30° more lagging than the positive-sequence impedance $Z_1$; and with high-resistance grounding, $Z_0$ may be as much as 60° more leading than $Z_1$. This would have the effect of rotating all of the $kI_0$ factors 30° lagging or 60° leading, respectively. For intermediate conditions of grounding, the quantity $Z_0$ may have any relative phase-angle between these limits, or said limits may be somewhat exceeded, under certain rare conditions.

The discriminating function $E'_m = K(I_1 + kI_0)$, Equation 1, is unaffected by this relative phase-angular shift of $Z_0$ with respect to $Z_1$, for three-phase faults and L—L, or line-to-line, faults, and it is practically unaffected by said phase-shift for L—G, or line-to-ground, faults, unless the value of $k$ approaches unity.

For 2L—G, or double line-to-ground, faults, the relative phase-angle shifting of the $kI_0$ response results in an alteration of the value of the indicated network voltage $E'_m$, and this alteration must be allowed for, in the calculations.

For a resistanceless three-phase fault ABC, indicated hereinafter by the subscript 3, the three line-currents $I_a$, $I_b$, and $I_c$ are balanced, so that $$I_0 = 0 \tag{8}$$

$$I_1 = \frac{E}{Z_1} = I_3 \tag{9}$$

where $E$ is the positive-sequence line-voltage. Substituting in Equation 1, we obtain the network-voltage for an ABC fault as follows:

$$E'_{ABC} = K\frac{E}{Z_1} = KI_3 \tag{10}$$

For a line-to-line fault, the phase-designating letters of the network will always be chosen so that the fault is on phase BC, so that the following equations will hold:

$$I_0 = 0 \quad (11)$$

$$I_1 = \frac{E}{Z_1+Z_2+R_F} = \frac{Z_1}{Z_1+Z_2+R_F}I_3 \quad (12)$$

where $R_F$ is the fault-resistance between phase-wires. The principles of my invention will be illustrated just as well if we assume that the fault-resistance $R_F$ is negligible. Therefore, substituting Equations 11 and 12 in Equation 1, the network voltage for a BC fault is $$E'_{BC} = \frac{1}{2}KI_3 \quad (13)$$

For a double line-to-ground fault, the phase-designating letters will always be chosen so that the fault is on phases BCG, so that $$I_0 = -I_1\frac{Z_2}{Z_2+Z_0+3R_F} \quad (14)$$

where $R_F$ is the fault-resistance between the two phase-conductors (in parallel) and ground. We will again assume that $R_F$ is negligible. It is necessary to note, however, that the relative phase-angle $\theta$ between $Z_0$ and $Z_1$ will affect the phase-angle between $I_0$ and $I_1$. The absolute value $$\bar{E}'_m$$

of the measured voltage $E'_m$ is affected by the relative phase of $I_0$ with respect to $I_1$. We can write, for $Z_0$, therefore, $$Z_0 = wZ_1\epsilon^{j\theta} = wZ_1(\cos\theta + j\sin\theta) \quad (15)$$

where a positive value of $\theta$ indicates that $Z_0$ is leading $Z_1$, and a negative value of $\theta$ indicates that $Z_0$ is lagging behind $Z_1$.

Equation 14 then becomes $$I_0 = -I_1\frac{1}{1+w\epsilon^{j\theta}} \quad (16)$$

For a double line-to-ground fault BCG, it is also known that $$I_1 = \frac{E}{Z_1+\dfrac{1}{\dfrac{1}{Z_2}+\dfrac{1}{Z_0+3R_F}}}$$

$$= \frac{1+w\epsilon^{j\theta}}{1+2w\epsilon^{j\theta}}I_3 \quad (17)$$

Again substituting in Equation 1, we find the network-voltage for a BCG fault as follows:

$$\bar{E}'_{BCG} = KI_3\left|\frac{1-k+w\epsilon^{j\theta}}{1+2w\epsilon^{j\theta}}\right| \quad (18)$$

where the bars indicate absolute or scalar values.

For a single line-to-ground fault, commonly referred to simply as a ground fault, the phase-designating letters will always be chosen so that the fault is on phase AG, so that $$I_1 = I_0 = \frac{E}{Z_1+Z_2+Z_0+3R_F} = \frac{Z_1}{2Z_1+Z_0}I_3 \quad (19)$$

where $R_F$ is the fault-resistance. Then $$\bar{E}'_{AG} = KI_3\left|\frac{1+k}{2+w\epsilon^{j\theta}}\right| \quad (20)$$

For faults which are symmetrical with respect to phases other than $a$, we will reletter the sequence filter or network so that the fault will be symmetrical with phase-$a$ of the relettered network-phases.

For faults symmetrical with respect to originally lettered phase $b$, Equations 4, 1, 13, 18 and 20 then become $$E'_{mb} = 3I_0R_0 + 3I_bR + j\sqrt{3}I_cR - j\sqrt{3}I_aR \quad (21)$$

$$\bar{E}'_{mb} = K|(a^2I_1+kI_0)| = K|(I_1+akI_0)| \quad (22)$$

where the bars indicate absolute or scalar values;

$$E'_{CA} = \frac{1}{2}KI_3 \quad (23)$$

$$\bar{E}'_{CAG} = KI_3\left|\frac{1-ak+w\epsilon^{j\theta}}{1+2w\epsilon^{j\theta}}\right| \quad (24)$$

and $$\bar{E}'_{BG} = KI_3\left|\frac{1+ak}{2+w\epsilon^{j\theta}}\right| \quad (25)$$

For the remaining kinds of faults, AB, ABG and CG, Equations 4, 1, 13, 18 and 20 become $$E'_{mc} = 3I_0R_0 + 3I_cR + j\sqrt{3}I_aR - j\sqrt{3}I_bR \quad (26)$$

$$\bar{E}'_{mc} = K|(I_1+a^2kI_0)| \quad (27)$$

$$E'_{AB} = \frac{1}{2}KI_3 \quad (28)$$

$$\bar{E}'_{ABG} = KI_3\left|\frac{1-a^2k+w\epsilon^{j\theta}}{1+2w\epsilon^{j\theta}}\right| \quad (29)$$

$$\bar{E}'_{CG} = KI_3\left|\frac{1+a^2k}{2+w\epsilon^{j\theta}}\right| \quad (30)$$

From the foregoing exemplary calculations, it will be seen that it is necessary to know how to choose the value of the constant $k$, in the network, so as to obtain any desired response-characteristic with respect to the 10 different kinds of faults. For instance, in the protection of transmission lines against faults, it is sometimes desirable to have straight-differential protection, sometimes ratio-differential protection; sometimes it is desired to have, as nearly as possible, the same value of the network-voltage for all of the 10 possible different kinds of faults, and sometimes it is desirable to have a more sensitive response to some particular kinds of faults than to others.

The value of the weighting-factor $k$ is determined by Equation 7, and $k$ is readily varied by varying the resistance $R_0$. The factor $k$ can be made equal to zero by making $(R+R_0)=0$, which means that the resistance $R_0$, in Fig. 1, will be omitted altogether, and the neutral return-connection 11 will be made at the two-thirds point in 3R, as indicated at 18, producing a network equivalent to that which is shown in Fig. 2 with the double-throw switch 19 in its lower position.

Figure 2:
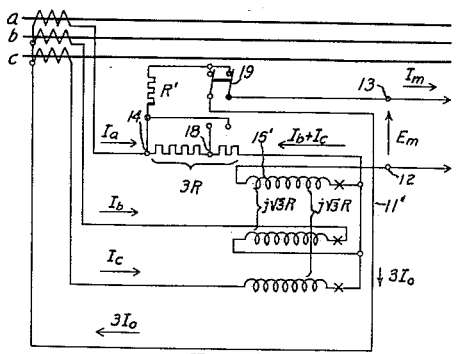
Fig. 2 is a similar view showing a network in which the zero-sequence response is negative with respect to the positive-sequence response.

The value of $k$ can also be made negative, by shifting the neutral-point connection 11 to the left of the point 18, in Fig. 1, and, for still larger values of $k$ than are attainable with the resistance 2R, a connection such as that shown in Fig. 2 may be utilized, in which an additional resistance R' is added, in a neutral return-circuit 14, 11', connected at the input-end 14 of the 3R resistor in the $a$-phase. In Fig. 2, the secondary winding 15' of the impedance Z is connected in the lead 12 of the measuring circuit, instead of in the lead 13 as in Fig. 1, although the connection could be made in either lead, as will be obvious.

The equations for the Fig. 2 network, for negative values of $k$, are as follows:

$$E'_m = -3I_0R_1 - 3(I_b+I_c)R + j\sqrt{3}(I_b-I_c)R$$

$$= 6R\left(I_1 - \frac{2R+R_1}{2R}I_0\right) \quad (31)$$

and $$k = -\frac{2R+R_1}{2R} \quad (32)$$

It is also possible to choose the weighting-factor $k$ so that it will have a vector value, involving a phase-angle shift, instead of a wholly real value as in Equation 7. This may be obtained by changing the resistance $R_0$, in Fig. 1, to an impedance having any desired phase-angle, or it may be conveniently changed by introducing a reactance X in one of the leads 12 of the measuring-circuit, the reactance X being a mutual reactance having a primary winding 21 which is introduced in the neutral return-circuit, traversed by the neutral current $3I_0$, by opening a switch 22 which is indicated in Fig. 1. The reactance X can be introduced in either a leading or lagging direction, in the measuring circuit, by means of a reversing switch 23 as shown in Fig. 1.

Other equivalent connections for introducing a response $kI_0$, in the measuring circuit will readily suggest themselves to those familiar with such circuits.

Figure 7:
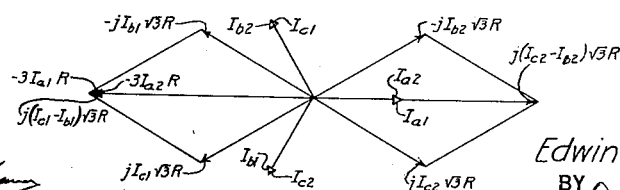
Fig. 7 is a vector-diagram illustrating the phase-sequence network.

Referring to Fig. 7, the problem is first to provide a network which will respond solely to the positive-sequence current, and then to introduce a factor $kI_0$, which is obtained by passing the neutral current through a suitable impedance. The positive-sequence network is characterized by having a resistance-branch $3R$ which is traversed by one of the phase-currents $I_a$, and leading and lagging impedance-branches $$j\sqrt{3}R$$

in the other two branches. These relative magnitudes and phase-angles of the resistance- and impedance-branches are so chosen that, for positive phase-sequence currents, $I_{a1}, I_{b1}, I_{c1}$, the impedance-drops will be additive, giving a positive phase-sequence response, whereas, for negative phase-sequence currents $I_{a2}, I_{b2}, I_{c2}$, the resultant of the responses to $I_{b2}$ and $I_{c2}$ will exactly neutralize the response to $I_{a2}$, thus avoiding any response to negative phase-sequence currents.

Figure 3:
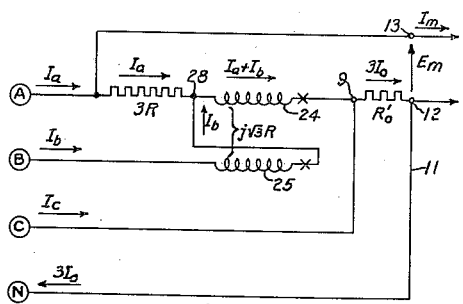
Figs. 3 and 4 are somewhat similar views showing other forms of embodiment of the network shown in Fig. 1.

In Fig. 3, I show, by way of example, another network for obtaining the response to $(I_1+kI_0)$. This network utilizes a two-winding reactor 24, 25, in lieu of the three-winding reactor Z of Fig. 1. The $I_a$ current is led to the network-terminal 13, and thence through a resistor $3R$ to a junction-point 28. The $I_b$ current is led through the reactor-winding 25 to the same junction-point 28, and the combined currents $I_a$ and $I_b$ then flow through the reactor-winding 24 to the neutral point 9. The self-inductance of the winding 24 is equal to $$j\sqrt{3}R$$

and the mutual inductance between the two windings 24 and 25 is also $$j\sqrt{3}R$$

The $I_c$ current is led directly to the neutral-point 9. From the neutral-point 9, the residual current $3I_0$ is led through a resistance $R'_0$ to the network-terminal 12, and is then returned through the neutral return-conductor 11. The measuring circuit, across the terminals 12 and 13, has the following responses:

$$E'_m = 6R\left(I_1 + \frac{R+R'_0+j\sqrt{3}R}{2R}I_0\right) \quad (33)$$

$$\overline{E'}_{mb} = 6R\left|\left(I_1 + \frac{(R+R'_0+j\sqrt{3}R)a}{2R}I_0\right)\right| \quad (34)$$

$$\overline{E'}_{mc} = 6R\left|\left(I_1 + \frac{(R+R'_0+j\sqrt{3}R)a^2}{2R}I_0\right)\right| \quad (35)$$

The phase of $$k = \frac{R+R'_0+j\sqrt{3}R}{2R} \quad (36)$$

may be controlled, if desired, by the methods described in connection with Fig. 1.

Figure 4:
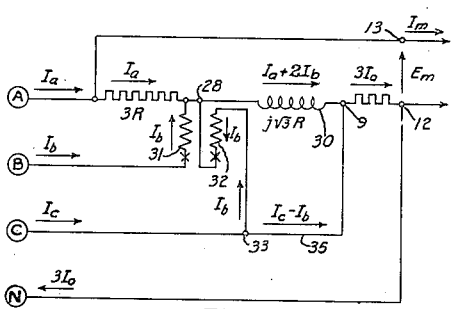

In Fig. 4, I show a network utilizing only a self-inductance winding 30 having an impedance $$j\sqrt{3}R$$

and an auxiliary current-transformer 31, 32 having a one-to-one ratio. The $I_a$ current is led to the terminal 13, and thence through $3R$ to the point 28. The $I_b$ current is led through the transformer-winding 31 to the point 28. The $I_c$ current is led to a point 33, where it is joined by $-I_b$ which is derived from a branch-circuit extending from the point 33, through the transformer-winding 32 in the reverse order, and thence to the point 28. This gives a current $(I_a+2I_b)$ in a conductor leaving the point 28 and passing through the inductance 30, and thence to the neutral-point 9. From the point 33, another conductor 35 carries a current $(I_c-I_b)$ directly to the neutral-point 9. The rest of Fig. 4 is the same as Fig. 3, and the response is the same as expressed in Equations 33, 34 and 35.

Other networks are known and many variations may easily be devised, for obtaining a positive-sequence response; and the zero-sequence factor $kI_0$ can readily be added to these networks by adding a voltage-drop caused by passing the neutral current through any desired value of impedance. The particular networks illustrated in Figs. 1 to 4 are intended to be regarded, therefore, as merely illustrative of certain embodiments of my invention, and not as limiting my invention to the precise networks shown.

I have thus shown how to control the weighting-factor $k$ by varying its magnitude, by making it either positive or negative, or by making it a vector-quantity with any specified phase-angle. I have also shown how to exactly calculate the fault-responses or measuring-circuit voltages $E'_m$ which are obtained for all ten of the different possible kinds of faults, as shown in Equations 10, 13, 18, 20, 23, 24, 25, 28, 29 and 30. These calculations can readily be made if the magnitude of the positive-sequence line-impedance $Z_1$ is known, and also the ratio $w$ and the phase-angle $\theta$ which define the zero-sequence line-impedance $Z_0 = wZ_1 e^{j\theta}$ as stated in Equation 15.

From the ten equations defining the different fault-responses in terms of the weighting-factor $k$, the $Z_0$ ratio $w$, the $Z_0$ phase $\theta$, and the three-phase fault-response $KI_3$, it is possible, by rigorous mathematical solution, to choose the magnitudes, and if necessary, the phase-angles, of the weighting-factor $k$ which will give the best or maximum percentage-ratio W of the lowest fault-response $E'_m$ as compared with the largest of the ten fault-responses for any given line. Thus $$W = \frac{\text{smallest of the ten fault-responses } E'_m}{\text{largest of the ten fault-responses } E'_m} 100\% \quad (37)$$

For scalar (or wholly real) values of the weighting-factor $k$, and for a zero-sequence line-impedance $Z_0$ having the same phase-angle as $Z_1$, which means that $\theta=0$ and $e^{j\theta}=1$, the values of $k$ giving the best values of W, or the least variation in the network-voltages for different kinds of faults, are indicated by the following equations, which have been calculated from Equations 10, 13, 18, 20, 23, 24, 25, 28, 29, and 30, covering the range from solidly grounded systems, where $w=1$ or less, to poorly grounded systems, where $w=30$ or more.

For values of $w$ between 0 and 1, $$k = 0 \Big]_{w=0}^{w=1} \quad (38)$$

Under these conditions, the lowest percentage-response W, for any fault, varies from 50%, at $w=0$, to 33% at $w=1$, as expressed by $$W = \frac{1}{2+w} \Big]_{w=0}^{w=1} \quad (39)$$

For values of $w$ between 1 and 4, $$k = -\frac{1}{2}w - 2 \Big]_{w=1}^{w=4} \quad (40)$$

These conditions are obtained by putting $$E'_{AG} = -E'_{BC} = -\frac{1}{2}E'_{ABC}$$

Under these conditions, the lowest percentage-response W, for any fault, varies from 33%, at $w=1$, to 50% at $w=4$, as expressed by $$W = \frac{1+2w}{3(2+w)} \Big]_{w=1}^{w=4} \quad (41)$$

For values of $w$ between 4 and infinity, $$k = -w \Big]_{w=4}^{w=\infty} \quad (42)$$

These conditions are obtained by putting $E'_{BCG} = E'_{ABC}$. Under these conditions, the lowest percentage-response W, for any fault, remains constant at 50%, as expressed by $$W = 0.5 \Big]_{w=4}^{w=\infty} \quad (43)$$

If the phase-angle of $Z_0$ with respect to $Z_1$ is other than $\theta = 0°$, in the expression $$Z_0 = wZ_1 \epsilon^{i\theta}$$

Equation 15, the highest values of W are obtained (for most values of $w$) by making the weighting-factor $k$ a vectorial quantity $$k = \overline{k}\epsilon^{-i\theta}$$

which brings the vector $kI_0$ into line with $I_1$. Then Equations 38 to 43 will hold, for the scalar or absolute value $$\overline{k}$$

If the complication of an impedance or vectorial value of $k$ is not desired, pure resistances may be used, giving scalar values of $k$, and calculations may be made, from the ten Equations 10, 13, 18, 20, 23, 24, 25, 28, 29, and 30, to obtain the positive or negative values of $k$ which give the highest percentage-ratio W of fault-response, for any given values of $w$ and $\theta$, defining $$Z_0 = wZ_1 \epsilon^{i\theta}$$

If desired, non-scalar values of the weighting-factor $k$ may be utilized, without making the phase-angle of $k$ equal and opposite to $Z_0$.

While I have indicated how to adjust my sequence-network so as to obtain the highest value of W, that is, to have the least variation in the measuring-voltages E'm obtained for any of the ten possible kinds of faults, it should be distinctly understood that such refinements are by no means necessary, as, in many instances, no practical difficulty is encountered in the fault-responsive relays so long as the range of variation in E'm, for different kinds of faults, is not greater than some such ratio as 4:1, or even 10:1 or higher, making W=25%, or even 10% or less. This is particularly true where a saturating transformer is utilized, as will be subsequently described.

An easy approximate method for fixing $k$, particularly on lines which are not solidly grounded, is to make $$E'_{AG} = E'_{BC}, \text{ or } k = \frac{1}{2}w \quad (44)$$

ignoring the phase-angle $\theta$ of $Z_0$.

In some transmission systems, particularly where there are tap-connected loads, or loads tapped off at an intermediate point or points in the line-section, it might be desirable to deliberately desensitize the responsiveness to one particular kind of fault, such as a three-phase fault, or a phase-to-phase fault, while making the relay quite sensitive to ground-faults, in which case one could introduce a multiplying-factor N, making $$E'_{AG} = NE'_{BC}, \text{ or } k = \frac{1}{2}Nw \quad (44')$$

It is also quite practicable to empirically adjust my phase-sequence network, without knowing the values of $Z_1$ or $Z_0$ for the transmission line under consideration. Thus, phase-faults do not involve $I_0$, as indicated by the Equations 13, 23 and 28 for E'BC, E'CA and E'AB. Therefore, the phase-sequence network may be adjusted, by changing the number of turns on the saturating transformer (subsequently described), or by adjusting the back-stop or bias of the relay (subsequently described) which responds to the network voltage, until the tests show that the desired relay-response to phase-to-phase faults is obtained. In these tests, the value of $R_0$ is immaterial, because there is no zero-sequence current $I_0$. Then a separate adjustment may be made on $R_0$ to obtain any desired responsiveness to ground-faults AG, BG or CG.

My network, which is responsive to $(I_1 + kI_0)$, may be utilized in a number of different ways.

Fig. 5 illustrates the application of the network shown in Fig. 1 to the energization of a tripping relay 37 which energizes the trip-coil 38 of a circuit-breaker 39 in the line $a, b, c$.

Figure 6:
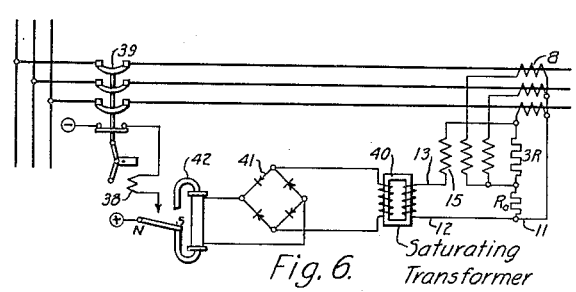
Fig. 6 is a view similar to Fig. 5, showing the addition of a saturating transformer and a rectifier, and also showing the utilization of a polarized relay.

Fig. 6 shows another embodiment of my invention, in which the network-leads 12 and 13, instead of feeding directly into the tripping relay, feed into a saturating transformer 40 which supplies its output, through a rectifier 41, to the actuating coil of a polarized relay 42 which is utilized as a tripping relay for energizing the trip-coil 38.

In Fig. 6, I have shown a polarized relay 42 by a conventional symbolized representation. It will be understood that any suitable type of such a relay may be utilized, here and in other figures hereof. A very desirable form of polarized relay is described and claimed in an application of Lenehan and Rogers, Serial No. 114,974, filed December 9, 1936.

As previously pointed out, the rectifier 41, which is shown in Fig. 6, reduces the wattless-current burden on the phase-sequence network, and hence on the current-transformers 8; and it also makes possible the utilization of a polarized relay 42 which derives a major portion of its operating-energy from its polarizing magnet, thereby still further reducing the required burden on the phase-sequence network. The use of the saturating transformer 40, in this combination, serves the purpose of making it possible to tolerate wider discrepancies in the measured voltage $E'_m$, for the different kinds of faults, because the measured voltages are more or less equalized, by the saturation of the transformer, before being applied to the relay 42. The saturating transformer also serves the very useful purpose of limiting the voltage which is applied to the rectifiers 41, so that rectifiers of small voltage-rating may be utilized.

Fig. 8 shows one illustrative embodiment of an application of my novel phase-sequence network to the differential protection of some electrical device or apparatus such as a transmission line. A three-phase line-section to be protected is indicated at 44, extending between the buses 45 and 46 in different substations. The relaying equipments of the two ends of the protected line-section are identical, so that a description of one will suffice for both. Each end of the line-section has a circuit breaker 39 having a trip-coil 38, the energization of the trip-coil being controlled by a polarized relay 42.

The currents leaving the substation are measured by means of current-transformers 8 and are passed through a phase-sequence network similar to that which is shown in Fig. 1, except that the primary winding-turns 15 of the impedance Z are indicated as being adjustable, and the resistors 3R and $R_0$ are also indicated as being adjustable.

In ordinary practice, if it is necessary to change Z and 3R at all, the adjustments will be made together, and in proportion to each other, so that the impedance of Z will always be $$j\sqrt{3}R$$

where R is $\tfrac{1}{3}$ of the adjusted value of the resistor 3R. This adjustment is useful in balancing any discrepancies in the transformation-ratios of the current-transformers 8 at the two ends of the protected line-section.

The $R_0$ adjustment is useful in adjusting the weighting-factor $k$ which controls the amount of response to the zero-sequence current $I_0$.

In Fig. 8, the output-terminals 12 and 13 of the network are connected to a saturating transformer 40 in series with a pair of pilot wires 48 which extend from one terminal to the other terminal of the protected apparatus. When the protected apparatus is a transmission-line section, as illustrated, the pilot wires 48 extend from one substation to another. When the protected apparatus is located all at one substation, the pilot wires 48 will extend a matter of feet instead of miles, and usually one tripping relay will suffice, the other being replaced by an equivalent dummy impedance.

In the case of a transmission-line section, as shown in Fig. 8, it is usually economical to connect each end of the pilot-wire 48 to its associated network through an insulating transformer 50, which has a high-voltage winding 51 connected to the pilot-wires 48, and a low-voltage winding 52 connected between the phase-sequence network and the saturating transformer 50. The effect of this insulating transformer is to reduce the effective impedance of the pilot-wires 48, as reflected into the measuring-circuit conductors 12 and 13. By this means, the effective impedance of the pilot-wires may be reduced to a substantially negligible value.

In Fig. 8, the output of the saturating transformer 40 is utilized, as in Fig. 6, to energize the operating coil of a polarized relay 42 through a rectifier 41. In order to make it possible to adjust the setting of the relay 42 to the particular conditions existing on any particular line-section which is to be protected—for instance, for a desired response to phase-faults—the primary winding of the saturating transformer 40 is made adjustable, as indicated at 53.

In the normal operation of the protective section shown in Fig. 8, the current leaving the left-hand bus 45 and entering the line 44 is exactly equal, and opposite in phase, to the current leaving the right-hand end of the line 44 and entering the bus 46. As each phase-sequence network responds to the current leaving its associated bus, these normal power-currents flowing in the line 44 produce voltages in opposite directions in their measuring-circuit terminals 12 and 13. It will be noted that the pilot-wire connections 48 are reversed, in connecting onto the insulating transformers 50 at the respective ends thereof, so that the voltage which appears across the low-voltage coil 52 of the left-hand end of the pilot wire 48 is 180° reversed with respect to the measuring-voltage indicated by the phase-sequence network at the right-hand end of the line-section, so that this voltage is exactly opposed to the measuring-circuit voltage at the left-hand end of the line. The result of the foregoing is that the saturating transformer 40, at the left-hand end of the line, receives no voltage under normal power-flow conditions in which the current flows "through" the protected line-section, with equal currents entering and leaving the line-section at opposite ends.

If an external fault occurs, on the transmission system shown in Fig. 8, the word "external" meaning that the fault occurs somewhere outside of the protected section 44, the current flowing in the line 44 will still be a "through" current, so that the balanced-voltage conditions hereinabove described will still apply, and there will be no energization of the tripping coil 42 at either end of the line-section.

In order to avoid the possibility of an erroneous response of an extremely sensitive tripping-relay 42, as a result of "shock" or "transient" conditions when the current is suddenly increased in the pilot-wire circuit, resulting in shock-excitation conditions in this circuit, and producing a transient which makes the voltage in the low-voltage winding 52 of the left-hand insulating transformer 50 a little slower or faster, in building up, than the network-voltages at the two ends of the protected line-section, I prefer to delay the rate at which a tripping flux is built up in the polarizing relay 42. If the voltage of the direct-current supply-circuit for the relay 42 is sufficiently high, this delay could be obtained by means of a capacitor connected across the direct-current terminals. However, the direct-current voltage is usually too low for the effective utilization of a capacitor of reasonable size, so that, in such cases, it is better to introduce means for delaying the building up of the current in this circuit, or to introduce means for delaying the building up of the flux produced by the operating coil of the polarized relay 42. The most convenient means for doing this consists in the utilization of a short-circuited ring 55 which is placed on the same magnetic core as the operating coil of the polarized relay 42.

I find it desirable, under most transmission-line conditions, to introduce the time-delay action of the order of one cycle, by means of the short-circuiting ring 55 or equivalent means, thereby not only taking care of "shock" excitation of the pilot-wire circuit, which can be readily foreseen and calculated, but also taking care of other (possibly unforeseen or not readily calculable) transients on the transmission-system, such as switching and lightning transients, so as to avoid faulty relaying operations. Usually, the introduction of a time-delay which lengthens, to nearly one cycle, the time of securing a fault-response, is not sufficiently significant to be particularly objected to by the operating engineers who are responsible for the operation of a transmission-line; and the added safety, obtained by this delay, as a protection against faulty tripping from any cause, is usually more to be desired than any attempts to speed up the fault-response to times less than one-half of a cycle.

In the event of an internal fault on the protected-line-section 44 of Fig. 8, that is, a fault occurring within this line-section, the fault-currents will be flowing into the protected line-section, at each end thereof, so that the measuring voltages will be additive, and the tripping-relays 42 will be energized.

In Fig. 8, it will be noted that the insulating transformers 50 entirely insulate the terminal equipment from the pilot-wires, avoiding any interconnection between the station-batteries, such as the tripping-batteries indicated by the symbols (+) and (—). In direct-current pilot-wire systems, differences betwen the voltages of the station-batteries have been a fruitful source of trouble. My insulating transformers 50 also take up, in their insulation, any differences occurring between the ground-potentials which exist in the different stations.

My differential, pilot-wire relaying system, as shown in Fig. 8, has a further advantage in that it requires no potential-transformers whatsoever, since the relay operates solely on current-differential by comparing the currents at the two ends of the protected line-section. Since no potential-transformers are utilized, and since the relay does not have to wait for a comparison of the phase of the line-current with respect to the phase of the line-potential, as in relaying systems utilizing power-directional relays, my relaying system, as shown in Fig. 8, is inherently fast in its operation. The time-delay which I introduce by means of my short-circuited coil 55 may be as short or as long as other considerations may dictate, and has nothing to do with the time necessary to effect a directional comparison between a current and a voltage, as in power-directional relays.

An additional advantage of my novel relaying system, as shown in Fig. 8, is that it avoids the difficulties, with respect to out-of-step conditions, which have been encountered in the carrier-current protective systems which have heretofore been standard for the protection of transmission-lines. In all previous systems, utilizing power-direction, these difficulties under out-of-step conditions have been encountered, because the phases of the line-voltages at the two ends of the line-section are swinging apart from each other, during such out-of-step conditions, so that the "through" line-current has different power-directional or "phase" relationships with respect to the corresponding line-voltages at the two ends of the protected line-section, resulting in faulty or unwanted tripping-operations under certain conditions. In my system, as shown in Fig. 8, the operation is dependent solely upon the magnitude of the totalized line-currents flowing into the protective section at the two ends thereof. Under fault-free out-of-step conditions, this totalized current is necessarily zero, and my relay will not trip, thus avoiding the necessity for additional protective features to take care of out-of-step conditions.

My system, as shown in Fig. 8, also has an additional feature, involving the use of a pushbutton 57 which is utilized for the purpose of disconnecting the phase-sequence network from its associated insulating transformer 50, and for connecting a voltmeter V across the low-voltage winding 52 of the insulating transformer 50. By depressing this pushbutton 57, it becomes possible to test the pilot-wire for continuity, by indicating the voltage coming over the pilot-wire from the remote end of the protected line-section. This voltage should be the same as the voltage at the local end. If the wires are continuous, depressing the test pushbutton 57 will show the voltmeter reading from the other end, and will thus provide a means for checking the operativeness of the system. Such tests may be made at periodic intervals, as operating conditions may dictate.

My pilot-wire system, as shown in Fig. 8, also has a further feature, involving the grounding of the mid-point of the high-voltage winding 51 of the insulating transformer 50, at each end of the line-section, as indicated at 59. This grounding of the mid-point at 59 minimizes pilot-wire troubles as follows. If one of the pilot-wires becomes open-circuited, the relays 42 will still trip their respective circuit breakers, but with a somewhat increased relay-setting.

In case the two pilot-wires become short-circuited, or both grounded, the relay 42 at each end becomes simply an overcurrent relay. Many operating companies prefer to have the settings of my differential protective system so adjusted that the relays will not trip, as overcurrent relays, for maximum load-current conditions, in the event of a short-circuiting of the pilot-wires.

If both of the pilot-wires in Fig. 8 should become open-circuited and not grounded, the relays would not trip at all. However, if a voltage-check is made at reasonable intervals, by means of the pushbutton 57, the probability of faults occurring at a time when the pilot-wires 48 are out-of-service, or faulty in any respect, will be very small.

In Fig. 9, I illustrate my invention in a ratio-differential, circulating-current protective-relay system for a 3-phase line-section 44 to be protected. In this system, the output of the filter-network, from the leads 12 and 13, is fed into the low-voltage winding 61 of a saturating transformer 62, the number of turns of this low-voltage winding being adjustable as indicated at 63. This saturating transformer 62 has a high-voltage winding 64 which energizes a neon-lamp resistor 65, or other equivalent non-linear resistance-device having the property of drawing current only at the peak of an alternating voltage-wave. The high-voltage winding 64 of the saturating transformer 62 is also provided with a tapped point 66 which energizes a differential polarized relay 67 in a manner which will subsequently be described.

The differential polarized relay 67 is symbolically represented, as if its movable armature 69 is a permanent polarizing magnet, as indicated by the north and south poles N, S. It also has a stationary core 70 which carries an operating or tripping coil 71 and a restraining coil 72. This polarized relay 67 may be of any desired type, preferably that which is shown in the previously mentioned Lenehan and Rogers application, Serial No. 114,964.

The output of the tapped point 66 of the saturating transformer 62 is supplied to the low-voltage winding 52 of the insulating transformer 50, through one diagonal of a serially connected rectifier-bridge 74, the other diagonal of which supplies the restraining coil 72 with rectified current. Provision is usually made for adjusting the number of turns of the restraining winding 72, as indicated at 75. Across the terminals of the low-voltage winding 52 of the insulating transformer 50, is connected the input-diagonal of another rectifier-bridge 76, the output-diagonal of which supplies the tripping or operating coil 71 with rectified voltage.

In Fig. 9, the high-voltage winding 51 of the insulating transformer 50 at one end of the protected line-section is connected to the corresponding high-voltage winding 51 at the other end, by means of pilot-wires 48' which are not crossed, in this case. Thus, whereas the Fig. 8 system normally had balanced measuring-circuit voltages E'm, so that no current circulated in the pilot-wire during normal or "through"-current conditions, my Fig. 9 system is so arranged that, under these conditions, the two measuring-circuit voltages E'm are additive, causing a current to normally circulate in the pilot-wires 48' during through-current conditions, when the same current which enters the line-section at one end leaves it at the other end.

In Fig. 9, the design is such that the equivalent impedance $Z_P$ of the pilot-wires is negligibly small, as compared with the sum of the equivalent impedance $Z_R$ of the restraining coil 72 plus the equivalent impedance $Z_F$ of the filter-network, so that, under normal through-current conditions, the impedance-drop of the circulating current in the pilot-wire impedance $Z_P$ is substantially zero, practically all of the impressed voltage being consumed in the remaining portions of the circuit $(Z_R+Z_F)$. The equivalent impedance $Z_P$ of the pilot-wires takes into consideration the transformation-ratios of the two transformers 62 and 50, and may be made to include also the impedance of the insulating transformer 50. The impedance $Z_R$ of the restraining coil 72 takes into consideration the transformation-ratio of the saturating transformer 62, and it also includes the impedances of said transformer 62 and the rectifier-bridge 74.

From Fig. 9, it will be obvious that the impedance-drop in the pilot-wire impedance $Z_P$ determines the voltage which appears across the low-voltage winding 52 of the transformer 50, which, in turn, is the same as the voltage impressed upon the tripping or operating coil 71 through the rectifier 76. Since this $Z_P$ impedance-drop is substantially zero, under normal through-current conditions, the operating coil 71 is thus normally deenergized and the relay is prevented from operating.

When a fault occurs within the protected line-section 44, the operating coil 71 is energized proportionately to the magnitude of the fault-current, while the restraining coil 72 is energized approximately proportionately to the "through" current-component corresponding to whatever load-current is carried by the system at the time of fault.

As in Fig. 8, the speed of operation of the polarized relays 67 is preferably held back by means of a short-circuited coil 55 or its equivalent.

While I have illustrated my ratio-differential, pilot-wire protective system, in Fig. 9, as utilizing a transformer 62 of a type which saturates, so as to limit the voltage, and although I have further illustrated said system as further utilizing a non-linear voltage-limiting neon-lamp resistance 65, it is to be distinctly understood that, although these features are embodied in my preferred form of embodiment of the invention, the invention, in its broadest aspects, is by no means limited thereto, and does not require the utilization of said features. The combination including the neon-lamp 65 or its equivalent constitutes the invention of M. A. Bostwick and is described and claimed in a concurrently filed Bostwick application, Serial No. 182,980, filed January 3, 1938, on Pilot-wire relaying.

In Fig. 9, I show means for periodically testing the pilot-wires 48' by means of a pushbutton 77 and an ammeter 78. The ammeter 78 is connected in circuit with the low-voltage coil 52 of the insulating transformer 50, in series with a resistance 79 which is normally short-circuited by the pushbutton 77. When the pushbutton 77 is depressed, it removes the short-circuit from the resistance 79, and the change in the reading of the ammeter 77 will indicate whether the pilot-wires 48' are shorted, grounded or open-circuited, or whether they are in sound operative condition.

If the pilot-wire open-circuits, in Fig. 9, there will be substantially no current in the restraint-coil 72 of the relay, and the relay will operate as a simple overcurrent relay, causing tripping at any point in the line, where fault-current of sufficient magnitude is fed into the line-section, regardless of whether the fault is internal or external. If the pilot-wires 48' should become short-circuited, the operating coil 71 of each relay would be, in effect, short-circuited, and the relay could never operate, so that it is necessary to guard against such a condition by sufficiently frequent periodic checks on the pilot-wire by means of the pushbutton 77.

In order to describe the operating characteristics of the differential pilot-wire features of my invention more in detail, I shall refer briefly to the schematic equivalent-circuit diagrams which are shown in Figs. 10 to 14.

In the subsequent theory of utilization-circuits and relay-characteristics, the line-current will be generalized into a single current, $$I_s = I_{1s} + kI_{0s} \quad (45)$$

entering the sending end, and another current, $$I_r = I_{1r} + kI_{0r} \quad (46)$$

leaving the receiving end of the protected line-section. The terms "sending" and "receiving" are simply convenient names, and are not intended to imply a particular power-direction. It will be understood that $I_{1s}$ and $I_{1r}$ are the positive-sequence components of the sending and receiving currents $I_s$ and $I_r$, respectively, and that the $I_{0s}$ and $I_{0r}$ are the corresponding zero-sequence current components. The fault-current is then $$I_f = I_s - I_r \quad (47)$$

The measuring-circuit voltages E'm of the phase-sequence filter-networks at the two ends of the line-section will be proportional to the currents $I_s$ and $I_r$, respectively. Distinguishing these two measuring-voltages by adding the subscripts $s$ and $r$ to distinguish between the sending and receiving ends, we may write $$E'_{ms} = CI_s \text{ and } E'_{mr} = CI_r \quad \text{(48)}$$

$C$ being a constant. As explained in connection with Fig. 1, $E'_m$ is the internal voltage of the filter, which is in series with the filter-impedance $Z_F$ in the measuring- or output-circuit of the filter. In Figs. 10 to 14, therefore, the filter is indicated symbolically as an electromotive force $E'_m$ in series with an impedance $Z_F$.

Fig. 10 represents the equivalent of the pilot-wire loop-arrangement which is shown more in detail in Fig. 8, representing a protective system giving straight differential protection, that is, protection which is responsive directly to the difference between $I_s$ and $I_r$, regardless of the magnitude of the "through" current-component in the line. As in Fig. 1, we will designate the measuring current as $I_m$, which will represent the current circulating in the pilot wires in Fig. 10. Then $$I_m = \frac{E'_{ms} - E'_{mr}}{Z_P + Z_T + Z_F} = \frac{C}{Z_P + Z_T + Z_F}(I_s - I_r) \quad \text{(49)}$$

or $$I_m = \left|\frac{C}{Z_P + Z_T + Z_F}\right| \overline{I_f} \quad \text{(50)}$$

As previously explained, $Z_P$, $Z_T$ and $Z_F$ are the impedances of the pilot-wires, operating or tripping coil and phase-sequence filter, respectively; and the horizontal and vertical bars indicate absolute or scalar values of the quantities.

Under normal conditions, $I_s = I_r$, $I_f = 0$, and no current flows in the relay-coils, in Fig. 10. The relay-settings are based upon the total fault-current fed in from both ends, since the relay-current, $I_m$, is proportional to this value. The operating characteristics of the relay-circuit illustrated in Fig. 10 is simply that of a fast over-current relay. When the sum of the fault-currents, fed into the section from the ends, exceeds the magnitude of the relay trip-setting, the relay operates to trip the circuit breakers 39 simultaneously at both terminals of the line-section.

In considering the formulas which have been previously derived for expressing the performance of the phase-sequence filter-network, and in applying these formulas to the pilot differential system shown in Fig. 10, it will be noted that the positive-sequence current $I_1$, which is effective in the formulas, is now the difference between the positive - sequence components $(I_{1s} - I_{1r})$ at the two ends of the line-section. In like manner, the zero-sequence current-component $I_0$, which is to be utilized in the formulas, is now the difference between the zero-sequence components $(I_{0s} - I_{0r})$ of the currents $I_s$ and $I_r$ at the two ends of the line-section. My pilot differential relaying systems are therefore independent of the distribution of the sequence-currents $I_1$ and $I_0$ at the two ends of the line-section.

Heretofore, in systems which have been grounded at only one end, or which have been heavily grounded at one end and only lightly grounded at the other end, the ground-current components $I_0$ have been concentrated almost exclusively at the heavily grounded end, so that insufficient ground-currents have been available at the other end for satisfactory relay-operation. My pilot-differential systems avoid this difficulty by being responsive to the totals of the respective sequence-components $I_1$ and $I_0$ of the currents flowing into the line-section at the two ends thereof, regardless of which end supplies the larger component.

Fig. 11 shows the equivalent of the pilot-wire loop-arrangement which is shown in detail in Fig. 9. The voltages $E'_{ms}$ and $E'_{mr}$ normally act in series with each other, to circulate a restraint-current proportional to the load-current which is transmitted through the line-section. The voltage between the pilot-wires, at a point midway between the two stations, is zero; and if the pilot-wire impedance $Z_P$ is made relatively small compared with $(Z_R + Z_F)$, there is a negligible voltage across the operating or tripping coils O (corresponding to the rectifier 76 and the coil 71 in Fig. 9). Under these conditions, through-current produces current only in the restraining coils R (corresponding to the rectifier 74 and the coil 72 in Fig. 9).

If equal currents flow into the line-section, from the two ends thereof, feeding a fault within the line-section, the network voltages $E'_{ms}$ and $E'_{mr}$ will be equal and opposed, assuming no "through"-current flowing at the time of fault. Under these conditions, no current will circulate over the pilot-wires. The current in each restraining coil R, or 72, will necessarily, however, be exactly equal to the current in its corresponding operating coil O, or 71, at that end of the line-section, for this condition of an internal fault without any through-current. My differential relay 67 of Fig. 9 is so designed, however, that it has a very large number of turns in the operating coil, as compared with the number of turns in the restraining coil, so that the relay is very sensitive to fault-currents, and is strongly energized by such currents, thereby providing a positive operating differential in the relay. In a preferred form of embodiment of my invention, I have successfully utilized 4,000 turns in the operating coil O or 71, and from 200 to 500 turns in different taps of the restraining coil R or 72, although I am obviously not limited to these precise proportions.

In the differential polarized relay 67 shown more in detail in Fig. 9, there are three forces which act on the relay according to the following equation:

Operating coil = restraining coil + spring and magnetic bias, or $$C_T|I_s - I_r| = C_R|I_s + I_r| + B \quad \text{(51)}$$

As previously indicated, absolute values are designated by the use of a horizontal bar over a symbol, or by the use of vertical bars instead of parentheses. The absolute values are effective, due to the rectification of the quantities for use in energizing the coils.

The differential relay 67 operates, therefore, whenever the fault-current magnitude $$\overline{I_f} = |I_s - I_r|$$

exceeds a fixed proportion of the average through-current, $$\frac{1}{2}|I_s + I_r|$$

plus a constant. This characteristic is a circle having a diameter equal to $$\frac{C_R}{C_T}|I_s + I_r| + \frac{B}{C_T}$$

The vectors $I_s$ and $I_r$ terminate on the circle at opposite ends of any diameter. Tests and theory also indicate that the tripping locus of $I_r$ lies on a circle. This characteristic is the same as has been utilized heretofore in the ratio-differential protection of generators and transformers. When both the through-current and the fault-current become very large (or when the relay is made extremely sensitive by reducing its fixed restraint B), the two variable terms of Equation 51 become large compared with B, so that B becomes negligibly small. The tripping point then approaches the pure ratio:

$$\bar{I}_f = \frac{C_R}{C_T}|I_s + I_r| \quad \text{(52)}$$

The foregoing explanation applies to the diagram as shown in Fig. 11, without the addition of the voltage-limiting devices comprising the saturating characteristic of the saturating transformer 62 and the non-linear characteristic of the neon-lamp resistance 65. If the filter-outputs are subjected to such voltage-limiting devices, before being applied to the pilot-wire and to the relay-circuit combination, the characteristics of the resulting network may be understood by consideration of the limiting value of voltage.

In various electrical circuits, it has often been desirable to limit the amount of energy in a particular part of the circuit during overload conditions. When saturating transformers or reactors have been included in the circuit for bringing about this limitation, a flat-topped flux-wave has been produced, which, in turn, causes a very sharply peaked voltage-wave.

In the relay-system which is shown in Fig. 9, where the output of the saturating transformer 62 is compared with the output of a corresponding saturating transformer at the other end of the line-section or other differentially protected device, the effect of the peaked voltage-wave would be to introduce harmonics, which would distort the phase-angle effects between the compared currents at the two ends of the line or other differentially protected electrical device.

To eliminate this difficulty, a gaseous-conduction device, such as a neon lamp, has been added, in accordance with the aforesaid invention of M. A. Bostwick. Since the neon lamp is essentially a high-voltage apparatus, it is usually desirable to provide enough turns on the high-voltage side of the saturating transformer 62 to accommodate a neon lamp of commercial design. The effect of the neon lamp is to add no burden during the low-voltage conditions of the voltage-wave, and to draw sufficient current, after the glow-discharge has started, to limit the peak of the voltage-wave. Thus, by combining the wave-distorting effects of the saturating transformer and the neon lamp, the output wave-form may be adjusted to a flat-topped or approximately sine-wave form.

In Figs. 9 and 11, therefore, to take into consideration the voltage-limiting effect of the saturating transformer 62 and the neon lamp 65, it may be assumed that the currents $I_r$ and $I_s$ do not exceed a constant limiting value $$\bar{I}_s$$

It may be further assumed that, as the actual line-currents increase beyond these limiting values, their corresponding measuring-circuit quantities will retain their relative phase-angle $\varphi$, but will not increase in value, so far as the relaying-circuit responses are concerned. We may write, therefore, $$I_s = \bar{I}_s \text{ and } I_r = \bar{I}_s \epsilon^{i\varphi} \quad \text{(53)}$$

Substituting these values in Equation 51, we obtain $$\left|1 - \epsilon^{i\varphi}\right| - \frac{C_R}{C_T}|1 + \epsilon^{i\varphi}| = \frac{B}{\bar{I}_s C_T}, \text{ a constant} \quad \text{(54)}$$

The balance-point of the relay thus depends solely upon the phase-angle $\varphi$ between the two currents $I_r$ and $I_s$, and the relay has pure directional characteristics, being dependent solely upon the relative directions of the currents at the sending and receiving ends.

If $$\frac{C_R}{C_T}$$

is unity and $$\frac{B}{\bar{I}_s}$$

is negligibly small or zero, Equation 54 is satisfied for $\varphi = \pm 90°$, and the relay would trip, with large line-currents, only when $I_r$ is over 90° out of phase with $I_s$, either leading or lagging. For other values of the constants, other angular limits are established, between $I_s$ and $I_r$, as the threshold of tripping.

An important characteristic of the relay with the phase-preserving voltage-limiting devices is that the relay becomes substantially a polarized directional element, for all current-magnitudes which are large enough to saturate the transformer. Such a relay, in combination with the pilot-wire circuit, compares the current-directions at the two ends of the line. It can be readily applied to practically any system, without regard to nicely matching the current-transformers at the two ends of the line or other differentially protected electrical apparatus. In other words, such a relay permits large ratio-inaccuracies in the current-transformers, without producing faulty tripping on heavy through-currents such as are obtained when a fault occurs outside of the protected line-section. At the same time, the relay still maintains a sensitive protective operation for internal faults, or faults occurring within the line-section or protected apparatus.

Fig. 12 shows a simplified circuit-diagram for a ratio-differential balanced-voltage system, as distinguished from the circulating-current system of Fig. 11. In this balanced-voltage system of Fig. 12, the restraint-coils R are connected directly across the network-terminals, and the operating coils O are connected in series with the pilot-wires, the pilot-wires being reversed, as in the case of the straight-differential balanced-voltage system of Fig. 10.

The operating characteristic of this circuit, as shown in Fig. 12, is given by the following equation $$C_T|I_s - I_r| = C_R|K_s I_s + K_r I_r| + B' \quad \text{(55)}$$

If we consider a relay, with characteristics as defined in Equation 55, at the end S of the protected line-section, that is, the end corresponding to the subscripts $s$, the constant $K_r$ will be smaller than the constant $K_s$ and will approach zero as the ratio of $Z_T$ to $Z_F$ is increased, or as the ratio of $Z_R$ to $Z_F$ is decreased. This characteristic is a circle. If $K_r$ were zero, the characteristic would be a circle of the radius $$\frac{C_R}{C_T}|K_s I_s| + \frac{B'}{C_T}$$

for any given value of $I_s$, with the center of the circle at the extremity of $I_s$. The effect of giving $K_r$ a finite value above zero is to move the circle upward and to increase its radius, while retaining its symmetry with respect to the vertical axis.

Fig. 13 shows a schematic diagram illustrating the application of my pilot-relay protective system to a multi-terminal transmission-line, that is, a line having more than two ends or terminals. It will be noted that Fig. 13, like Fig. 10, is a single-line diagram, and that, like Fig. 10, it may represent a polyphase line. If the line is polyphase, its ends or terminals are, in general, polyphase. In the case of a multi-terminal line, having a plurality of terminals R, S, T, U, for example, it is best to define the terminal currents as being positive when flowing into the line at each particular terminal, instead of defining $I_s$ as entering the line and $I_r$ as leaving the line, as was convenient in considering the two-terminal line. The fault-current thus becomes $$I_f = I_r + I_s + I_t + I_u \quad \text{(56)}$$

The several internal network-voltages $E'_{mr}$, $E'_{ms}$, $E'_{mt}$ and $E'_{mu}$ are proportional to the currents flowing into the line at these respective locations.

In Fig. 13, the pilot-circuit is so arranged that, when the currents flowing into the line add to zero, meaning that there is no internal fault in the line, the $E'_m$ voltages in the pilot-loop will likewise add to zero, and no current will flow through the operating coils O which are connected in series with the loop. Any fault within the line will produce a net current into the line, with a proportional net voltage in the pilot-loop, and the operating current in each relay will, therefore, be proportional to the totalized fault-current, the relays being set or adjusted on this basis.

If, at any terminal, as at U, in Fig. 13, tripping is not desired unless the local fault-current is larger than a predetermined magnitude, an additional overload element O' may be energized, either from the same sequence-network $E'_{mu}$, or from an additional network $E''_{mu}$, the contacts of the two relays O and O' being connected in series, so that the tripping-circuit of the circuit-breaker will not be energized unless both of these relays are energized.

Fig. 14 is a schematic diagram illustrating the application of my ratio-differential, circulating-current protective system to a multi-terminal line, the pilot-wire circuit being similar to that which has already been described in connection with Fig. 11. In this arrangement, if the pilot-wire impedance is made negligible, the operating-coil currents are all equal and are proportional to the vectorial average of the sequence-network voltages and hence are proportional to the total fault-current. Without any restraining coils at all, this arrangement would have the same tripping characteristics as the straight-differential, balanced-voltage multi-terminal system shown in Fig. 13. With the restraining coils included, as shown at R in Fig. 14, a characteristic similar to ratio-differential is obtained.

In the Fig. 14 system, if the intermediate stations are load-taps, of such nature that no fault-current $I_s$ and $I_t$ is fed back into faults occurring on the protected line, and if a through-fault should occur, that is, a fault outside of the line-section, causing a heavy through-current to flow through the line-section from station R to station U, the rtsraint-coils at the intermediate stations S and T would carry no current. In such an event, if an unequal saturation of the current-transformers at stations R and U were sufficient to cause current of operating magnitude to circulate in the pilot-circuit, the relays at the load-tap stations S and T would operate almost as if they were over-current relays, obtaining only a very slight advantage from their restraining coils. Such stations S and T, without sources, would, therefore, need additional fault-detector elements, as shown at O' in station U of Fig. 13, in case the current-transformer inaccuracies should exceed the relay-setting. However, as long as all terminals carry appreciable current during fault-conditions, in Fig. 14, considerable advantage is obtained by the ratio-differential characteristic, in increasing the permissible amount of current-transformer saturation.

Fig. 15 shows an embodiment of my invention, illustrating the manner in which back-up protection may be added to a straight-differential balanced-voltage system such as that shown in Fig. 8. In Fig. 15, the saturating transformer 40 has been omitted, and the rectifier-bridge 41 which energizes the tripping relay 42 is connected directly in series with the network measuring-circuit 12—13, in series with the insulating transformer 50 which brings in the pilot-wire circuit. An additional rectifier-bridge 80 is added, in Fig. 15, having its input-diagonal connected directly across the output-leads 12 and 13 of the phase-sequence filter. The output-diagonal of the rectifier-brige 80 energizes a back-up relay 81 which, in turn, energizes a timing motor 82 from any suitable source, such as the network-terminals 12 and 13. The timing relay 82 operates slowly, after a certain time delay, to close a tripping-circuit for the trip-coil 38 of the circuit-breaker 39.

Fig. 16 shows another exemplary form of embodiment of my invention illustrating how the relaying system is applied, by way of example, in the differential protection of a bus-section 84, having a plurality of generator- and load-feeders connected thereto, all of which feeders are protected by circuit-breakers 39 which are operated by trip-coils 38. The current flowing into the protected bus-section 84 through all of these feeders is totalized by adding the currents produced by the current-transformers 8, and the totalized current is utilized as the relaying current.

In Fig. 16, an auxiliary contactor-switch or relay 85 has been shown for providing the necessary number of contacts for energizing all of the trip-coils 38 of the various feeders which are connected to the bus-section 84, and this auxiliary contactor-switch 85 is controlled by a polarized relay 86, such as has previously been described, having operating and restraining coils or circuits as indicated by the letters O and R.

Fig. 16 also illustrates a somewhat different principle in the application of my invention, consisting in the utilization of two different networks for supplying energy to the two rectifier-bridges 87 and 88 which supply the restraining and operating coils R and O, respectively. The object in providing two different networks for these rectifiers 87 and 88, respectively, is to take into consideration the possible presence of harmonics, such as might be introduced by unequal saturations of the current-transformers 8, on heavy through-faults, or, in the case of a differential protective system for a power-transformer (not shown), the harmonics might be produced during the magnetizing in-rush conditions when power is first applied to the power-transformer.

In the phase-sequence networks shown in Fig. 16, I utilize a plurality of two-winding current-transformers 89, having a one-to-one ratio or any other convenient ratio, for supplying current to two inductances $j3R$ and $jR_0$ and a resistor $$\sqrt{3}R$$

for the network which is connected to the rectifier 87, and supplying current to two condensers $-j3R$ and $-jR_0$ and a resistor $$\sqrt{3}R$$

in the network which is connected to the other rectifier 88. Distinguishing the network-voltages $E'_m$ by adding the numeral-subscripts 87 and 88, the connections of the current-transformers 89 are made so as to obtain the following voltage-drops in the respective network measuring circuits:

$$E'_{m87} = I_a(j3R) - I_b(\sqrt{3}R) + I_c(\sqrt{3}R) + 3I_0(jR_0) \quad (57)$$

$$= j6R\left(I_1 + \frac{R+R_0}{2R}I_0\right) \quad \text{---------------} (58)$$

$$E'_{m88} = I_a(-j3R) + I_b(\sqrt{3}R) - I_c(\sqrt{3}R) + 3I_0(-jR_0) \quad (59)$$

$$= -j6R\left(I_1 + \frac{R+R_0}{2R}I_0\right) \quad \text{---------------} (60)$$

It will be noted that these equations are identical with Equation 6, for the Fig. 1 network, except for the shifting of the phase of the network-voltage $E'_m$ by introducing the operator $\pm j$, which does not change the absolute values $$\overline{E}'_m$$

which are the values to which the differential polarized relay 86 responds.

For the $n$th harmonic, indicated hereinafter by the subscript $n$ instead of $m$, the impedances of the inductances are multiplied by $n$, and the impedances of the capacitors are multiplied by $$\frac{1}{n}$$

thereby distorting the two networks, so that they are no longer totally unresponsive to the negative-sequence currents. This has the important function, however, of introducing a discriminating factor in the event of unbalanced harmonics in the totalized relaying current. The $n$th-harmonic responses of the two networks are then as follows:

$$E'_{n87} = j3nRI_a - \sqrt{3}RI_b + \sqrt{3}RI_c + j3nR_0 \text{---------} (61)$$

$$\overline{E}'_{n87} = 3nI_0(R+R_0) + 3I_1R(n+1) + 3I_2R(n-1) \text{--} (62)$$

$$E'_{n88} = -j\frac{3}{n}RI_a + \sqrt{3}RI_b - \sqrt{3}RI_c - j\frac{3}{n}R_0 \text{------} (63)$$

$$\overline{E}'_{n88} = \frac{3}{n}I_0(R+R_0) + 3I_1R\frac{n+1}{n} - 3I_2R\frac{n-1}{n} \text{----} (64)$$

For normal symmetrical three-phase conditions, there is normally no negative-sequence current $I_2$, and normally no zero-sequence $I_0$. It will be seen that the ratio of the operating-coil network-response $$\overline{E}'_{n88}$$

to the restraining-coil network-response $$\overline{E}'_{n87}$$

as a result of the $n$th harmonic of the positive-sequence current $I_1$, is dependent upon the factor $$\frac{1}{n}$$

which means that the relay becomes less sensitive to harmonics in the ratio $1:n$, according to the order $n$ of the harmonic. In the case of fault-conditions, the networks defined by Equations 61 to 64 will cause the relay-restraint response to be strengthened by the presence of harmonics, while the relay-operating response is weakened by the presence of harmonics, thus avoiding faulty relay-operations.

Thus, in Fig. 16, a single-element relay is provided, for bus-differential protection, having increased restraint for the poor wave-form current such as might be obtained due to unequal saturation of current-transformers during heavy through-faults, while still having a high degree of sensitivity for fundamental-frequency faults on the protected bus.

The essential feature, in obtaining the above-described preferential response to the fundamental, corresponding to $n=1$, is that the restraint-coil network shall have, in it, inductances and resistances, and that the operating-coil network shall have, in it, capacitances and resistances. It is not essential whether the resistance-branch is traversed by the $(I_c - I_b)$ current, as in Fig. 16, or by the $I_a$ current, as in Fig. 1. In Fig. 1, if an equivalent capacitance $$-j\sqrt{3}R$$

were substituted for the inductance-branch $$j\sqrt{3}R$$

the direction of the current-flow of $(I_c - I_b)$ in the capacitance would have to be reversed, as compared to what it was for the inductance, because of the opposite signs of these reactive impedances.

In general, in regard to the phase-angles of the impedances making up my network for eliminating the negative-sequence response, the only essential is that the resultant of the negative phase-sequence responses to $(I_c - I_b)$, in one of the impedance-branches, shall be equal in magnitude, and exactly opposite in phase, to the impedance-drop in the other branch which is responsive to the $I_a$ current. If the same impedance is to be traversed both by $I_b$ and $I_c$, this means that this impedance must be displaced by 90°, in either the leading or lagging direction, with respect to the impedance in the $I_a$ branch; although, if impedances having different phase-angles are utilized in the $I_b$ and $I_c$ branches, the resultant of these two impedance-drops may be made equal and opposite to the impedance-drop in the $I_a$ branch, for negative-sequence current, without having an exactly 90° phase-angle difference between the $I_a$ impedance and the impedances traversed by $I_b$ and $I_c$. For the 90° impedance-relation, the absolute value of the impedance in the $I_a$ branch is $$\sqrt{3}$$

times the absolute value of the impedance in the $(I_c - I_b)$ branch.

Fig. 17 illustrates a generalized condition, in a network in which the $I_a$ impedance consists of a resistance 3MR and an inductance $j3$NR, and the $(I_c - I_b)$ impedance consists of a resistance 3NR and a capacitance $-j3$MR, while the zero-sequence impedance is illustrated as being in phase with the $I_a$ impedance, as indicated by the zero-sequence resistance $MR_0$ and the zero-sequence inductance $jNR_0$.

In Fig. 17, the network-voltage is $$E'_{m17}=3RI_a(M+jN)-j\sqrt{3}R(I_c-I_b)(M+jN)+\\3I_0R_0(M+jN) \quad (65)$$

$$=6R(M+jN)\left(I_1+\frac{R+R_0}{2R}I_0\right) \quad (66)$$

In practical embodiments of my invention, it is desirable, as heretofore explained, for the operating coil to have many more turns than the restraining coil, in systems utilizing the differential polarized relay. It is desirable that this operating coil, or tripping coil, should have more resistance than the restraining coil, in order to make the relay generally applicable in a number of different circuits, including those shown in Figs. 10, 11 and 12, and in particular to make the relay so that it is useful in the Fig. 12 circuit, in which it is desirable for the impedance $Z_R$ of the restraining coil R to be less than the internal filter-impedance $Z_F$, and in which it is further desirable for the impedance $Z_T$ of the operating or tripping coil O to be larger than the internal filter-impedance $Z_F$. In one successful embodiment of my invention, $Z_T$ has been 320 ohms and $Z_R$ has been 20 ohms, including the rectifier-bridges, in each case, although it will be obvious that I am not limited to these particular values of resistances.

My insulating transformers 50, as shown in Figs. 8 and 9, for example, are quite useful, not only in keeping the relaying-equipment entirely insulated from the pilot-wires, but, as previously suggested, also in matching the impedance of the pilot-wires to the relaying-equipment to the best advantage. It is frequently desirable that the pilot-wire energy-level shall be kept within the limits of commercial telephone-lines, which fixes a maximum of 0.35 ampere and a maximum of 120 volts, according to present standards. The insulating transformers provide a means whereby these maxima can be observed, while still giving entirely reliable relay-action on power-lines having a ratio of maximum fault-current to minimum fault-current of over 100 to 1.

In my straight-differential system, such as that shown in Fig. 8, I have successfuly utilized an insulating transformer having a 20-to-1 ratio; whereas, in my ratio-differential system, such as that shown in Fig. 9, I have successfully utilized an insulating transformer having a 4-to-1 ratio, in combination with a saturating transformer having a 20-to-1 ratio. It will be understood, of course, that I am not limited to any particular ratio, however. In my straight-differential system, the ratio of the primary to secondary turns of the saturating transformer is unimportant, so far as pilot-wire matching is concerned, this ratio being chosen solely with regard to the particular setting of the overcurrent relay which is utilized.

An advantage of my pilot-wire relaying systems is that they obtain correct operation in the event of simultaneous faults, that is, when two or more faults occur at the same time, either at the same pole or place along the line, or at any two or more locations on the system, even though one fault is an internal fault and the other an external fault outside of the protected line-section. My pilot-wire relaying systems operate correctly for all types of simultaneous faults, either faults between wires or ground-faults, because of my totalization of the currents at the two ends of the protected line-section. In general, in previous carrier-current relaying systems utilizing blocking means or relays for preventing operation under certain conditions, there have been operational difficulties in the event of certain types of simultaneous faults.

A further advantage of my pilot-wire relaying-systems is that they permit the use of larger tapped-loads, that is, they are applicable to line-sections in which loads are tapped off from the line, at some intermediate point, or points, without being provided with circuit breakers at said tapped load-points. According to my invention, the currents at the two ends of the line-section are totalized, for both load-conditions and fault-conditions, so that my relay-settings need not be changed to allow for changes in the system set-up.

My straight-differential pilot-protective system, such as that shown in Fig. 8, has the advantage that its sensitivity to internal faults is not affected by the amount of through-current. Consequently, it is a very simple matter to provide a relay-setting which will not permit tripping in response to a certain amount of tapped-loads, while causing tripping for sufficiently severe faults in the tapped-load circuit. In ratio-differential systems, the relay-setting is dependent upon the amount of load-current flowing through the line, so that the tapped-load current which can be tolerated, without tripping, is a variable quantity, depending upon the through load-current.

For example, with my straight-differential protective system, if the total fault-current coming from both ends of the line-section is of the order of 1800 amperes, and if the maximum tapped-load is of the order of 100 or 200 amperes, there is a wide margin for discrimination.

Also, under some conditions, it may be required that the circuit-breakers shall not be tripped in the event of a fault on the low-tension side of a step-down transformer feeding a tapped-load from the line, that is, a transformer which is connected to some intermediate point in the line-section without being protected by a circuit-breaker. In such a case, if the total current flowing into the line from the two ends, and out of the tap to the low-tension fault, is not over 25 or 30% of the total fault-current which is obtained for an internal fault on the protected line-section, there is ample margin for discrimination. This is ordinarily the case, for loads that would be tapped off in this manner, without relaying equipment at the tap-point.

My straight-differential pilot-relay protective system, such as that shown in Fig. 8, has the limitation that the difference in the exciting currents of the current-transformers, on heavy through-faults, or through-currents due to external faults, combined vectorially with the charging current of the pilot-wire pair, cannot exceed the relay-setting. These are designed to balance each other for a medium length of pilot wire.

My straight-differential pilot-relaying system has the advantage of tripping all breakers simultaneously, regardless of the location of the fault, in a multi-terminal line. In systems in which reclosing circuit-breaker operation is desired, my straight-differential protective system may be arranged so as not to trip the breakers through which no fault-current flows, if desired, as illustrated in connection with Fig. 13.

My ratio-differential pilot-relaying system, such as that shown in Fig. 9, has the particular advantage that it is insensitive to current-transformer saturation, or to the poor matching of current-transformer ratios or phase-angles, so that existing current-transformers may generally be utilized, with this system.

My ratio-differential pilot-protective system has the further advantage of covering an exceptionally wide range of fault-currents.

While I have illustrated my invention in a number of different forms of embodiment, I desire it to be understood that such illustration is intended only by way of example, and not by way of limitation, as it will be obvious, to those skilled in the art, that many modifications in precise details of embodiment may be adopted without departing from the broader features of my invention. I desire, therefore, that the appended claims shall be accorded the broadest interpretation consistent with their language and the prior art.

I claim as my invention:

1. A phase-sequence filtering-network responsive to the three currents $I_a$, $I_b$ and $I_c$ in a three-phase device, comprising a plurality of means including impedance devices and circuits for obtaining responses to the several functions $I_a Z_a$, $I_b Z_b$, $I_c Z_c$ and $(I_a+I_b+I_c)Z_n$, respectively, where $Z_a$, $Z_b$, $Z_c$ and $Z_n$ are impedances, and means for producing, in effect, a measuring circuit in which are vectorially added the impedance-drops $I_a Z_a$, $I_b Z_b$, $I_c Z_c$ and $\pm(I_a+I_b+I_c)Z_n$, characterized by such values of the impedances $Z_a$, $Z_b$ and $Z_c$ that the negative-sequence responses make $$I_{2a}Z_a + I_{2b}Z_b + I_{2c}Z_c = 0$$

where $I_{2a}$, $I_{2b}$ and $I_{2c}$ are the negative-sequence symmetrical components of $I_a$, $I_b$ and $I_c$, $Z_n$ having such a value that the network has a resultant zero-sequence response.

2. A phase-sequence filtering-network responsive to the three currents $I_a$, $I_b$ and $I_c$ in a three-phase device, comprising a plurality of means including impedance devices and circuits for obtaining responses to the several functions $$I_a Z_a, \ (I_c - I_b)(jZ_a/\sqrt{3})$$

and $(I_a+I_b+I_c)Z_n$, respectively, where $Z_a$ and $Z_n$ are impedances, and means for producing, in effect, a measuring circuit in which are vectorially added the impedance-drops $$I_a Z_a, \ \pm(I_c - I_b)(jZ_a/\sqrt{3})$$

and $\pm(I_a+I_b+I_c)Z_n$, $Z_n$ having such a value that the network has a resultant zero-sequence response.

3. Means for utilizing a single relay to respond to any one of a plurality of different kinds of faults in a three-phase electrical device to be protected, comprising the combination, with said relay, of a selective-phase-sequence filter-means for energizing said relay with a current responsive, in a predetermined manner or manners, to the positive- and zero-sequence currents in the protected device, to the substantial exclusion of the negative-sequence current-response.

4. The invention as defined in claim 3, characterized by said relay being a polarized relay, and a rectifier being interposed between said relay and the selective-phase-sequence filter-means.

5. Means for utilizing a single direct-current relay to respond to any one of a plurality of different kinds of faults in a three-phase electrical device to be protected, comprising the combination, with said direct-current relay, of a selective-phase-sequence current-responsive filter-means associated with said device for deriving a single-phase quantity responsive to the polyphase currents in said device, a rectifier interposed between said filter-means and said direct-current relay, and a voltage-limiting device interposed between said rectifier and said filter-means.

6. Means for utilizing a single direct-current relay to respond to any one of a plurality of different kinds of faults in a three-phase electrical device to be protected, comprising the combination, with said direct-current relay, of a selective-phase-sequence current-responsive filter-means associated with said device for deriving a single-phase quantity responsive to the polyphase currents in said device, a rectifier interposed between said filter-means and said direct-current relay, and means for producing a predetermined time-delay in the rate at which flux-changes in said direct-current relay follow changes in the output of the rectifier.

7. A differential-protection apparatus for a polyphase electrical device having a plurality of polyphase terminals where current may enter or leave, comprising a selective-phase-sequence current-responsive filter-means associated with each terminal of the protected electrical device for deriving a single-phase quantity responsive to the polyphase currents in its associated terminal of the protected electrical device, means for totalizing said single-phase quantities obtained from the respective terminals, means for rectifying said totalized single-phase quantities, and means for utilizing the output of said rectifying means in the detection of faulty conditions in the protected electrical device.

8. A differential-protection apparatus for a polyphase electrical device having input and output terminals, comprising a selective-phase-sequence current-responsive filter-means associated with each terminal of the protected electrical device for deriving a single-phase quantity responsive to the polyphase currents in its associated terminal of the protected electrical device, a differential direct-current relay having a relay-operating circuit and a relay-restraining circuit, means for vectorially combining the aforesaid single-phase quantities, which are obtained from the respective terminals of the protected electrical device, into a single alternating quantity responsive to fault-currents flowing into the protected electrical device from both terminals thereof, means associated with at least one of the aforesaid single-phase quantities, obtained from at least one of the terminals of the protected electrical device, for providing another alternating quantity which is responsive, in some measure, to through-currents flowing into the protected electrical device at the input-terminal and out of the protected electrical device at the output-terminal, means for deriving a separate rectified current from each of said alternating quantities, and means for utilizing said rectified currents in the energization of the relay-operating circuit and the relay-restraining circuit of said direct-current relay.

9. A differential-protection apparatus for a polyphase electrical device having input and output terminals, comprising a selective-phase-sequence current-responsive filter-means associated with each terminal of the protected electrical device for deriving a single-phase quantity responsive to the polyphase currents in its associated terminal of the protected electrical device, a differential direct-current relay having a relay-operating circuit and a relay-restraining circuit, means for vectorially combining the aforesaid single-phase quantities, which are obtained from the respective terminals of the protected electrical device, into a single alternating quantity responsive to fault-currents flowing into the protected electrical device from both terminals thereof, means for vectorially combining the aforesaid single-phase quantities into another alternating quantity responsive, in some measure, to through-currents flowing into the protected electrical device at the input-terminal and out of the protected electrical device at the output-terminal, means for deriving a separate rectified current from each of said alternating quantities, and means for utilizing said rectified currents in the energization of the relay-operating circuit and the relay-restraining circuit of said direct-current relay.

10. A differential-protection apparatus for a polyphase electrical device having a plurality of polyphase terminals where current may enter or leave, comprising a selective-phase-sequence current-responsive filter-means associated with each terminal of the protected electrical device for deriving a single-phase quantity responsive, in a predetermined manner or manners, to the positive- and zero-sequence currents in the protected device, to the substantial exclusion of the negative-sequence current-response, means for totalizing said single-phase quantities obtained from the respective terminals, and means for utilizing said totalized quantities in the detection of faulty conditions in the protected electrical device.

11. A differential-protection apparatus for a polyphase electrical device having input and output terminals, comprising a selective-phase-sequence current-responsive filter-means associated with each terminal of the protected electrical device for deriving a single-phase output responsive, in a predetermined manner or manners, to two of the phase-sequence components of the polyphase currents in its associated terminal of the protected electrical device, to the substantial exclusion of the third phase-sequence component thereof, a voltage-limiting device associated with, and operative upon, each filter-output, means for totalizing the voltage-limited outputs, and means for utilizing said totalized quantities in the detection of faulty conditions in the protected electrical device.

12. A differential-protection apparatus for a polyphase electrical device having input and output terminals, comprising a selective-phase-sequence current-responsive filter-means associated with each terminal of the protected electrical device for deriving a single-phase output responsive to the polyphase currents in its associated terminal of the protected electrical device, a voltage-limiting device associated with and operative upon, each filter-output, means for vectorially combining the two voltage-limited outputs to derive two alternating quantities which are respectively responsive, in some measure, to the sum and difference of said voltage-limited outputs, and a differential fault-detecting relaying-means differentially responsive to said sum and difference.

13. A differential-protection apparatus for a polyphase electrical device having input and output terminals, comprising a selective-phase-sequence current-responsive filter-means associated with each terminal of the protected electrical device for deriving a single-phase output responsive to the polyphase currents in its associated terminal of the protected electrical device, a voltage-limiting device associated with, and operative upon, each filter-output, a differential direct-current relay having a relay-operating circuit and a relay-restraining circuit, means for vectorially combining the voltage-limited outputs to derive two alternating quantities which are respectively responsive, in some measure, to the sum and difference of said voltage-limited outputs, means for deriving a separate rectified current from each of said alternating quantities, and means for supplying said rectified currents to the relay-operating circuit and the relay-restraining circuit of said direct-current relay.

14. A differential-protection apparatus for an alternating-current electrical device having input and output terminals, comprising selective-phase-sequence current-responsive filter-means associated with each terminal for deriving a single-phase current-responsive alternating quantity responsive, in a predetermined manner or manners, to two of the phase-sequence components of the polyphase currents in its associated terminal, to the substantial exclusion of the third phase-sequence component thereof, a voltage-limiting device associated with, and operative upon, each of said current-responsive alternating quantities, means for totalizing the voltage-limited quantities, and means for utilizing said totalized quantities in the detection of faulty conditions in the protected electrical device.

15. A differential-protection apparatus for an alternating-current electrical device having input and output terminals, comprising current-responsive means associated with each terminal for deriving a current-responsive alternating quantity, a voltage-limiting device connected to each of the terminals for limiting the voltage of the corresponding current-responsive alternating quantity means for totalizing the voltage-limited quantities, and means for utilizing said totalized quantities in the detection of faulty conditions in the protected electrical device, said fault-detection means comprising a differential relay having a relay-operating circuit responsive to fault-currents flowing into the protected electrical device from both terminals thereof, and a relay-restraining circuit responsive, in some measure, to through-currents flowing into the protected electrical device at the input-terminal and out of the protected electrical device at the output-terminal.

16. Differential protective apparatus for a line-section of a polyphase transmission line comprising a selective-phase-sequence filter-means at each end for deriving a single-phase quantity responsive to polyphase currents in the line at its own end of the line-section, a pilot channel for totalizing the derived single-phase quantities obtained from the respective ends; and fault-responsive means, at each end, comprising means for rectifying the totalized quantities, and direct-current relaying-means for responding to the rectified quantities.

17. Protective apparatus for a polyphase electrical device, comprising a differential relay having a relay-operating circuit and a relay-restraining circuit, and two phase-sequence filtering-networks, both responsive to a polyphase electrical quantity in said protected electrical device, for energizing said operating and restraining circuits, respectively, each of said filtering-networks comprising resistance elements and reactance elements operatively associated to derive a single-phase quantity from the polyphase electrical quantity to which the network responds, one of said networks having inductive reactors and the other having capacitive reactors in such manner that the network which energizes the relay-operating circuit has a suppressed responsivity to harmonics, as compared to its fundamental-frequency response, whereas the other network has an exaggerated harmonic-response.

18. Fault-responsive apparatus for protecting a polyphase electrical device, comprising a force-producing means responsive preferentially to the positive-sequence component of the current in the protected device, a second force-producing means responsive preferentially to the zero-sequence component of said current, and a single means jointly acted upon by, and responsive to, both of said forces for effecting a fault-responsive operation.

19. Means for utilizing a single direct-current relay to respond to any one of a plurality of different kinds of faults in a three-phase electrical device to be protected, comprising the combination, with said direct-current relay, of a selective-phase-sequence current-responsive filter-means associated with said device for deriving a single-phase quantity responsive to the polyphase currents in said device, and a rectifier interposed between said filter-means and said direct-current relay.

20. Differential circulating-current protective equipment for an electrical apparatus having a plurality of terminals, current-responsive transformation-means associated with each of said terminals, each current-responsive transformation-means having an output-circuit having a voltage responsive to the current in the associated terminal, pilot-channel means connecting the output-circuits of the respective transformation-means in such manner that the output-circuit voltages in any two transformation-means are connected in opposition to each other, by the pilot-channel means, when the currents in the two corresponding terminals are either both flowing into, or both flowing out of, the protected electrical apparatus, and differential-relay means associated with at least one of said terminals, said differential-relay means having a relay-operating circuit and a relay-restraining circuit, the relay-operating circuit exerting the stronger controlling influence on the differential-relay means when the same current-strengths exist in the relay-operating-circuit and in the relay-restraining circuit, said relay-operating circuit including a relay-operating energy-translating device connected across the associated output-circuit of the associated current-responsive transformation-means, and said relay-restraining circuit including a relay-restraining energy-translating device connected in series with said associated output-circuit at a point between said output-circuit and said relay-operating energy-translating device.

21. Equipment as defined in claim 20, characterized by the combined impedances of said output-circuit and said relay-restraining energy-translating device being large as compared to the impedance of the pilot-channel means.

22. Differential circulating-current protective equipment for an electrical apparatus having a plurality of terminals, at least two of said terminals being geographically separated in different substations, current-responsive transformation-means associated with each of said terminals, each current-responsive transformation-means having an output-circuit having a voltage responsive to the current in the associated terminal, pilot-channel means connecting the output-circuits of the respective transformation-means in such manner that the output-circuit voltages in any two transformation-means are connected in opposition to each other, by the pilot-channel means, when the currents in the two corresponding terminals are either both flowing into, or both flowing out of, the protected electrical apparatus, and differential-relay means associated with at least each of said two geographically separated terminals, each of said differential-relay means having a relay-operating circuit and a relay-restraining circuit, the relay-operating circuit exerting the stronger controlling influence on the differential-relay means when the same current-strengths exist in the relay-operating-circuit and in the relay-restraining circuit, said relay-operating circuit including a relay-operating energy-translating device connected across the associated output-circuit of the associated current-responsive transformation-means, and said relay-restraining circuit including a relay-restraining energy-translating device connected in series with said associated output-circuit at a point between said output-circuit and said relay-operating energy-translating device.

23. Equipment as defined in claim 22, characterized by the combined impedances of said output-circuit and said relay-restraining energy-translating device, at each of the terminals which is equipped with differential-relay means, being large as compared to the impedance of the pilot-channel means.

24. A differential-protection apparatus for a polyphase electrical device having a plurality of polyphase terminals where current may enter or leave, comprising means associated with each of a plurality of polyphase terminals of the protected device for deriving a current-responsive alternating-current quantity, totalizing-means and selective-phase-sequence means associated with, and operative upon, said derived quantities, said totalizing-means having the property of totalizing a plurality of alternating-current quantities derived at different terminals, said selective-phase-sequence means having the property of deriving a single-phase quantity from a polyphase quantity, means for rectifying the resultant totalized single-phase quantities, and means for utilizing the output of said rectifying means in the detection of faulty conditions in the protected electrical device.

25. A differential-protection apparatus for an alternating-current electrical device having a plurality of alternating-current terminals where current may enter or leave, comprising means for deriving an alternating-current electrical quantity from the protected electrical device at each of a plurality of terminals thereof, means for totalizing said derived quantities obtained from the respective terminals, means for rectifying said totalized quantities, and means for utilizing the output of said rectifying means in the detection of faulty conditions in the protected electrical device.

EDWIN L. HARDER.